(12) United States Patent
Brophy

(10) Patent No.: US 9,641,619 B2
(45) Date of Patent: May 2, 2017

(54) SOCIAL MEDIA PLATFORM WITH GAMIFICATION OF USER-GENERATED CONTENT

(71) Applicant: Kevin M. Brophy, Philadelphia, PA (US)

(72) Inventor: Kevin M. Brophy, Philadelphia, PA (US)

(73) Assignee: VUID, Inc., Philadelphia, PA (US)

( * ) Notice: Subject to any disclaimer, the term of this patent is extended or adjusted under 35 U.S.C. 154(b) by 247 days.

(21) Appl. No.: 14/053,341

(22) Filed: Oct. 14, 2013

(65) Prior Publication Data

US 2015/0106446 A1 Apr. 16, 2015

(51) Int. Cl.
- *H04L 12/58* (2006.01)
- *H04L 29/08* (2006.01)
- *G06Q 50/00* (2012.01)
- *G06Q 30/02* (2012.01)

(52) U.S. Cl.
CPC ......... *H04L 67/12* (2013.01); *G06Q 30/0207* (2013.01); *G06Q 50/01* (2013.01); *H04L 51/32* (2013.01)

(58) Field of Classification Search
CPC ........ H04L 12/588; H04L 51/32; G06Q 50/01
See application file for complete search history.

(56) References Cited

U.S. PATENT DOCUMENTS

| | | | |
|---|---|---|---|
| 7,664,516 B2 | 2/2010 | Levi et al. | |
| 8,090,673 B2 | 1/2012 | Evans | |
| 8,155,679 B2 | 4/2012 | Levi et al. | |
| 8,438,055 B2 | 5/2013 | Levi et al. | |
| 8,452,646 B2 | 5/2013 | Levi et al. | |
| 8,457,670 B2 | 6/2013 | Levi et al. | |
| 2002/0077988 A1 | 6/2002 | Sasaki et al. | |
| 2007/0244749 A1* | 10/2007 | Speiser | G06Q 30/0212 705/14.14 |
| 2008/0004946 A1* | 1/2008 | Schwarz | G06Q 10/10 705/12 |
| 2008/0183750 A1 | 7/2008 | Lee et al. | |
| 2009/0006371 A1 | 1/2009 | Denoue et al. | |
| 2009/0089177 A1 | 4/2009 | Dayton et al. | |

(Continued)

OTHER PUBLICATIONS

International Search Report and Written Opinion; Mailed Jan. 29, 2015 for the corresponding PCT Application No. PCT/US2014/060508.

(Continued)

*Primary Examiner* — Jeong S Park
(74) *Attorney, Agent, or Firm* — Mendelsohn Dunleavy, P.C.

(57) ABSTRACT

Social media platforms with gamification of user-generated content, wherein users upload content that other users rate, and a winner is declared based on the ratings. In one embodiment, each user can post only once per day. In one embodiment, a random user is invited each day to create a post for display on the main landing page or "Spotlight" page to the entire community, while the remaining posts are in the "Backstage" area. In some embodiments, users are rewarded with cash or other prizes or rewards as an incentive for posting quality content. In one embodiment, the user who accumulates the most "likes" at the end of each calendar month is deemed the winner for that month.

22 Claims, 36 Drawing Sheets

(56) References Cited

U.S. PATENT DOCUMENTS

| | | | |
|---|---|---|---|
| 2009/0106103 A1 | 4/2009 | Milana et al. | |
| 2009/0150786 A1 | 6/2009 | Brown | |
| 2010/0161382 A1* | 6/2010 | Cole | G06F 17/30867 705/7.32 |
| 2010/0169463 A1 | 7/2010 | Harper | |
| 2010/0207329 A1* | 8/2010 | Bigelow | A63F 9/0098 273/299 |
| 2010/0257030 A1* | 10/2010 | Crocker | G06Q 10/00 705/12 |
| 2011/0225036 A1 | 9/2011 | Reddy et al. | |
| 2011/0300916 A1* | 12/2011 | Patchen | A63F 13/12 463/1 |
| 2012/0028232 A1* | 2/2012 | Findlay | G06Q 10/06 434/362 |
| 2012/0131013 A1* | 5/2012 | Hobbs | G06F 17/30283 707/748 |
| 2012/0179557 A1* | 7/2012 | Gross | G06Q 30/02 705/14.73 |
| 2012/0259866 A1 | 10/2012 | Austin et al. | |
| 2012/0323688 A1 | 12/2012 | Mesaros | |
| 2013/0191401 A1 | 7/2013 | Xia et al. | |
| 2013/0254716 A1* | 9/2013 | Mishra | G06F 3/04842 715/810 |

OTHER PUBLICATIONS

Blue Calypso—EMGAGE as retrieved from www.bluecalypso.com/Pages/Solutions/emgage.apsx on Oct. 31, 2013.

Blue Calypso—SOCIALECHO as retrieved from www.bluecalyso.com/Pages/Solutions/socialecho.aspx on Oct. 31, 2013.

MyLikes: How It Works as retrieved from http://mylikes.com/advertisers/how-it-works on Oct. 31, 2013.

* cited by examiner

SOCIAL MEDIA PLATFORM WITH GAMIFICATION OF USER-GENERATED CONTENT

BACKGROUND

Technical Field

The present invention relates, generally, to social networking, and more particularly, to the creation and promotion of user-generated content in a social media platform.

Description of the Related Art

A number of social media platforms, including, e.g., Twitter, Facebook, Instagram, SnapChat, Tumblr, and Vine, presently exist for users to share various types of content with one another. Such content may include text, images, audio, video, and other types of data. Although, over time, those social media platforms have now essentially become storehouses for vast amounts of such content, access to that content can be problematic.

For example, a user can be linked to a content creator so that new content is pushed to the user whenever it is uploaded by the content creator, but the user is often flooded with content, regardless of whether the user is actually interested in that content or not, or whether that content is high-quality content. Alternatively, a user can attempt to search for specific content, but the content is stored in a manner that forces the user to determine first that there is a need to access particular content and then initiate a search for that particular content.

Additionally, conventional social media platforms do not provide any meaningful way to organize content in a way that permits content creators to demonstrate their capabilities or showcase their talents. Nor does a conventional social media platform permit an average person to spread an important message to his or her community or to the world at large, to demonstrate his or her talents to a larger community or to the world, or to otherwise stand out, for example, to be able to find employment with a potential employer who is not necessarily looking for a candidate or advertising for an open position.

SUMMARY OF THE INVENTION

Embodiments of the invention provide solutions to the foregoing problems and additional benefits, by providing social media platform schemes that incentivize users to create interesting and unique content using gamification features, permit other users to rate that content, and reward users whose content is most-highly rated, in a competition-type setting.

In one embodiment, the invention provides a server-implemented method for operating a social media platform with gamification of user-generated content. The method includes: (a) the server permitting a plurality of users to register as members of the social media platform; (b) the server permitting a plurality of members to upload user-generated content; (c) the server permitting members to access user-generated content uploaded by other members of the social media platform; (d) the server permitting members to rate user-generated content uploaded by other members of the social media platform; (e) the server aggregating, over a time period, ratings from a plurality of members; and (f) the server declaring a winner from among the plurality of members based on the aggregated ratings over the time period.

In another embodiment, the invention provides a server for operating a social media platform with gamification of user-generated content. The server is adapted to: permit a plurality of users to register as members of the social media platform; permit a plurality of members to upload user-generated content; permit members to access user-generated content uploaded by other members of the social media platform; permit members to rate user-generated content uploaded by other members of the social media platform; aggregate, over a time period, ratings from a plurality of members; and declare a winner from among the plurality of members based on the aggregated ratings over the time period.

In yet another embodiment, the invention provides a non-transitory machine-readable medium, having encoded thereon program code, wherein, when the program code is executed by a machine, the machine implements a method for operating a social media platform with gamification of user-generated content. The method includes: (a) the server permitting a plurality of users to register as members of the social media platform; (b) the server permitting a plurality of members to upload user-generated content; (c) the server permitting members to access user-generated content uploaded by other members of the social media platform; (d) the server permitting members to rate user-generated content uploaded by other members of the social media platform; (e) the server aggregating, over a time period, ratings from a plurality of members; and (f) the server declaring a winner from among the plurality of members based on the aggregated ratings over the time period.

In a further embodiment, the invention provides a server-implemented method for operating a social media platform having a main landing page or showcase page and a secondary display area for content accessible via a manual selection option. The method includes: (a) the server permitting a plurality of users to register as members of the social media platform; (b) the server permitting a plurality of members to upload user-generated content; (c) the server permitting members to access user-generated content uploaded by other members of the social media platform; (d) prior to the beginning of a predetermined time interval, the server randomly selecting one member to create an item of user-generated content; and (e) during the time interval, the server permitting display of the randomly-selected item of user-generated content on the main landing page or showcase page and permitting display of all other items of user-generated content only in the secondary display area.

In still a further embodiment, the invention provides a server for operating a social media platform having a main landing page or showcase page and a secondary display area for content accessible via a manual selection option. The server is adapted to: permit a plurality of users to register as members of the social media platform; permit a plurality of members to upload user-generated content; permit members to access user-generated content uploaded by other members of the social media platform; prior to the beginning of a predetermined time interval, randomly select one member to create an item of user-generated content; and during the time interval, permit display of the randomly-selected item of user-generated content on the main landing page or showcase page and permit display of all other items of user-generated content only in the secondary display area.

In yet a further embodiment, the invention provides a non-transitory machine-readable medium, having encoded thereon program code, wherein, when the program code is executed by a machine, the machine implements a method for operating a social media platform having a main landing page or showcase page and a secondary display area for content accessible via a manual selection option. The method includes: (a) permitting a plurality of users to register as members of the social media platform; (b) permitting a plurality of members to upload user-generated content; (c) permitting members to access user-generated content uploaded by other members of the social media platform; (d) prior to the beginning of a predetermined time interval, randomly selecting one member to create an item of user-generated content; and (e) during the time interval, permitting display of the randomly-selected item of user-generated content on the main landing page or showcase page and permitting display of all other items of user-generated content only in the secondary display area.

DETAILED DESCRIPTION

Figure 1:
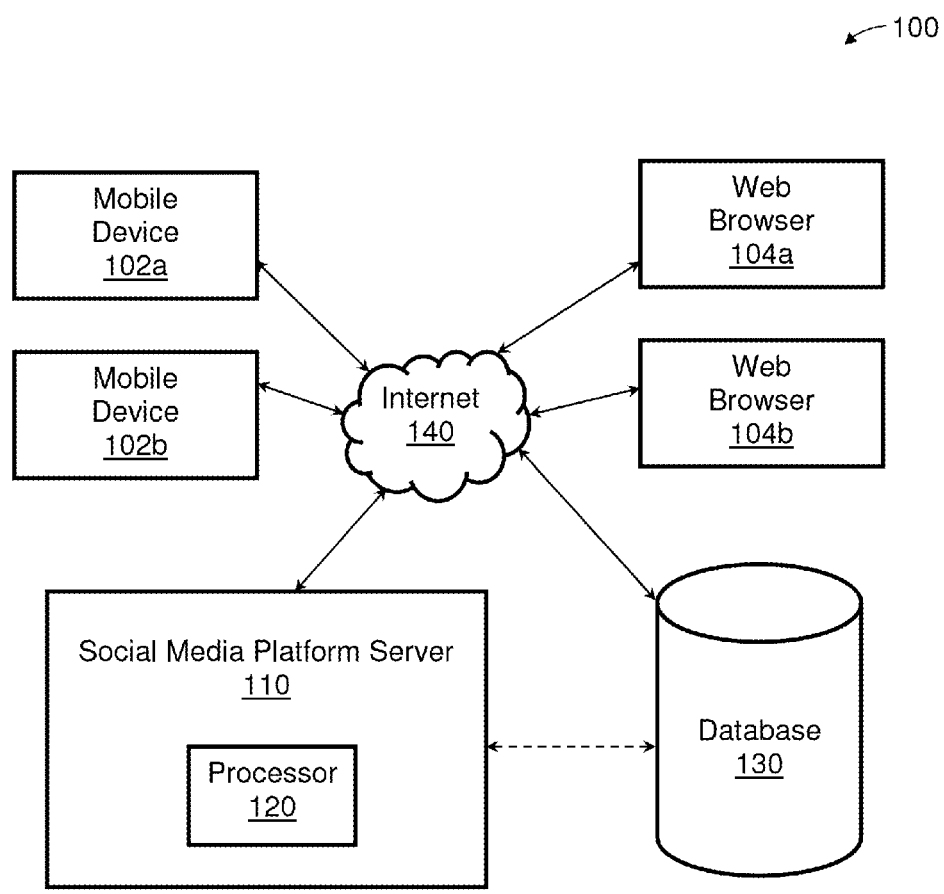
FIG. 1 is a system diagram illustrating an exemplary social media platform consistent with one embodiment of the invention.

Certain embodiments of the invention provide web-based social media platforms for incentivizing the creation of user content using gamification features, i.e., harvesting content by having users compete with one another in the process of creating that content. In various embodiments of the invention, gamification and related features employed may include one or more, or all, of the following features:

In one embodiment, each user of the social media platform is permitted to post only once per day. That post may include only a single item of content, e.g., a video, a text article, an image (such as a photograph, drawing, or painting), a multimedia presentation, or the like. All of the posts are made available to all users for viewing. By limiting the number of posts allotted to each user, the social media platform encourages users to post higher quality content and to spend more time and effort in composing posts.

In one embodiment, every day, the server conducts a lottery daily to select, at random, one user from among all of the users of the social media platform. The randomly-selected user is notified (e.g., by email or text message) that he or she has been randomly selected and is given a limited window of time (e.g., 48 hours) to create a post for the main landing or showcase page of the social media platform, dubbed the "Spotlight" page. In other words, that randomly-selected user has the opportunity to create and display to all of the users of the social media platform, during a limited window of time (e.g., 24 hours), one item of content on the Spotlight page. The remaining items of content are available for display to all of the users of the social media platform in an area dubbed the "Backstage" area, which is accessed via a manual option by user selection. By randomly selecting content from an ordinary user and displaying that content to the entire community of social media platform users on the landing page, the social media platform provides ordinary users with the opportunity to have their content seen by their community or the world at large.

In one embodiment, users are given the opportunity to "like" posts, i.e., to rate items of content posted by other users. The server tracks "likes" received for each item of content, as well as the total "likes" that each user receives during a month. When viewing posts in the Backstage area, users can also share posts with other users and can sort the display of posts by various criteria, e.g., the most "likes" received, most viewed, most shared, date posted, etc. By providing a community rating system, the social media platform encourages users to post content that other users find interesting and wish to rate highly. Users will want their posts to be seen as many people as possible and to receive as many "likes" as possible. The more visibility a post receives, the more likes the post will receive, and the higher ranked the post will be on the lists of posts sorted by most "likes" received.

In some embodiments, users are rewarded with cash or other prizes or rewards as an incentive for posting quality content. In one embodiment, the user who accumulates the most "likes" at the end of each calendar month is deemed the winner for that month. In another embodiment, the post that accumulates the most "likes" at the end of each week is deemed the winner for that week.

In one embodiment, a posting user may post anonymously with respect to other users, although the server can still identify the poster.

In one embodiment, additional incentives are provided to users to incentivize content creation. For example, upon the occurrence of certain events or conditions, a user may receive an additional entry into the daily lottery, such that a post of a single item of content counts as two entries into the daily lottery. Those events or conditions might include, e.g., the user inviting a friend who signs up for the social media platform, the user successfully posting content every day for an entire week, a post exceeding a particular threshold of "likes," a user accumulating a certain threshold of "likes" or having content rated in a certain percentile, or the like.

Hardware Platform

With reference first to FIG. 1, an exemplary social media platform 100 consistent with one embodiment of the invention is illustrated. As shown, platform 100 includes a social media platform server 110 having a processor 120 adapted to perform functions based on software instructions, to implement the functionality described in various embodiments of the invention herein. Server 110 is in communication, via the Internet 140, with one or more mobile devices 102a, 102b, and with one or more web browsers 104a, 104b. Mobile devices 102a, 102b and/or web browsers 104a, 104b might be used, e.g., by end users who are creators and/or consumers of content in the social media platform. Mobile devices 102a, 102b and/or web browsers 104a, 104b might also be used, e.g., by system administrators of server 100 for performing administrative and maintenance functions of server 110. Server 110 is also in communication, via the Internet 140 (or, alternatively, via a local network or direct connection), with a database 130, which is used for storing various data for implementing the functionality described in various embodiments of the invention herein, including user-generated content.

Exemplary Software Application Interface

FIGS. 2 through 35 are screen views of an exemplary user interface for a software application running on mobile devices 102a, 102b, in one embodiment of the invention. It should be understood that these screen views and the hardware and software arrangements described with respect to these screen views are merely exemplary, and that other applications, screen views, devices, systems, and methods for implementing a social media platform consistent with embodiments of the invention are possible.

Figure 2:
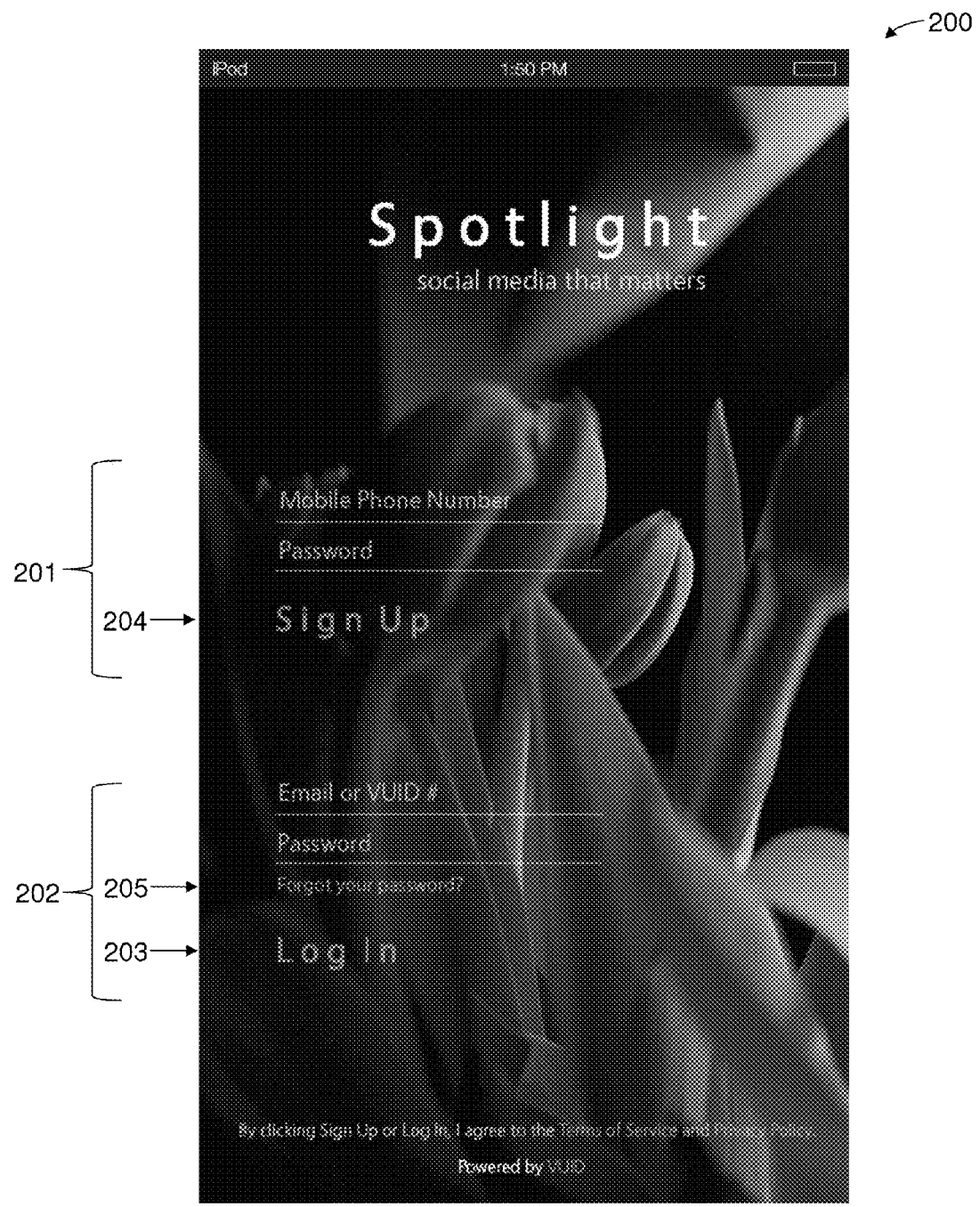
FIG. 2 shows an exemplary screen view of a welcome screen, in one embodiment of the invention.

Turning now to FIG. 2, an exemplary screen view 200 of a welcome screen, in one embodiment of the invention, is illustrated. As shown, the user is prompted to provide sign-up information in either a sign-up information area 201 or login information in a login information area 202.

Figure 3:
FIG. 3 shows an exemplary screen view of a sign-up screen, in one embodiment of the invention.

If the user is a first-time user, then the user provides sign-up information in the sign-up information area 201, e.g., as shown in FIG. 3. In this embodiment, sign-up information includes the user's mobile phone number and a chosen password.

If the user is already a registered user, then the user provides login information in the login information area 202. In this embodiment, the user logs in using his or her already-chosen password, together with either (i) his or her email address or (ii) a unique numeric identification number 110 (also referred to herein as a "VUID" number) preassigned by server 110 (or preselected by the user and registered with server 110) and used to identify the user. After providing the login information, the user selects a "Log In" button 203 to initiate the login process. In the event a registered user has forgotten his or her password, a "Forgot your password?" button 205 is provided to lead the user to a password-reset or password-reminder procedure.

FIG. 3 shows an exemplary screen view 300 of a sign-up screen, in one embodiment of the invention. As shown, the user is prompted with a first entry field 301 for providing a phone number and a second entry field 302 for providing a chosen password. The user may be presented with particular requirements for the password (e.g., 8 characters or more, at least one uppercase letter, etc.), and a check mark may appear or disappear adjacent to entry field 302 to indicate whether the current password complies with those requirements. After providing the sign-up information, the user selects the "Sign Up" button 303 to continue to the verification process, e.g., as shown in FIG. 4.

Figure 4:
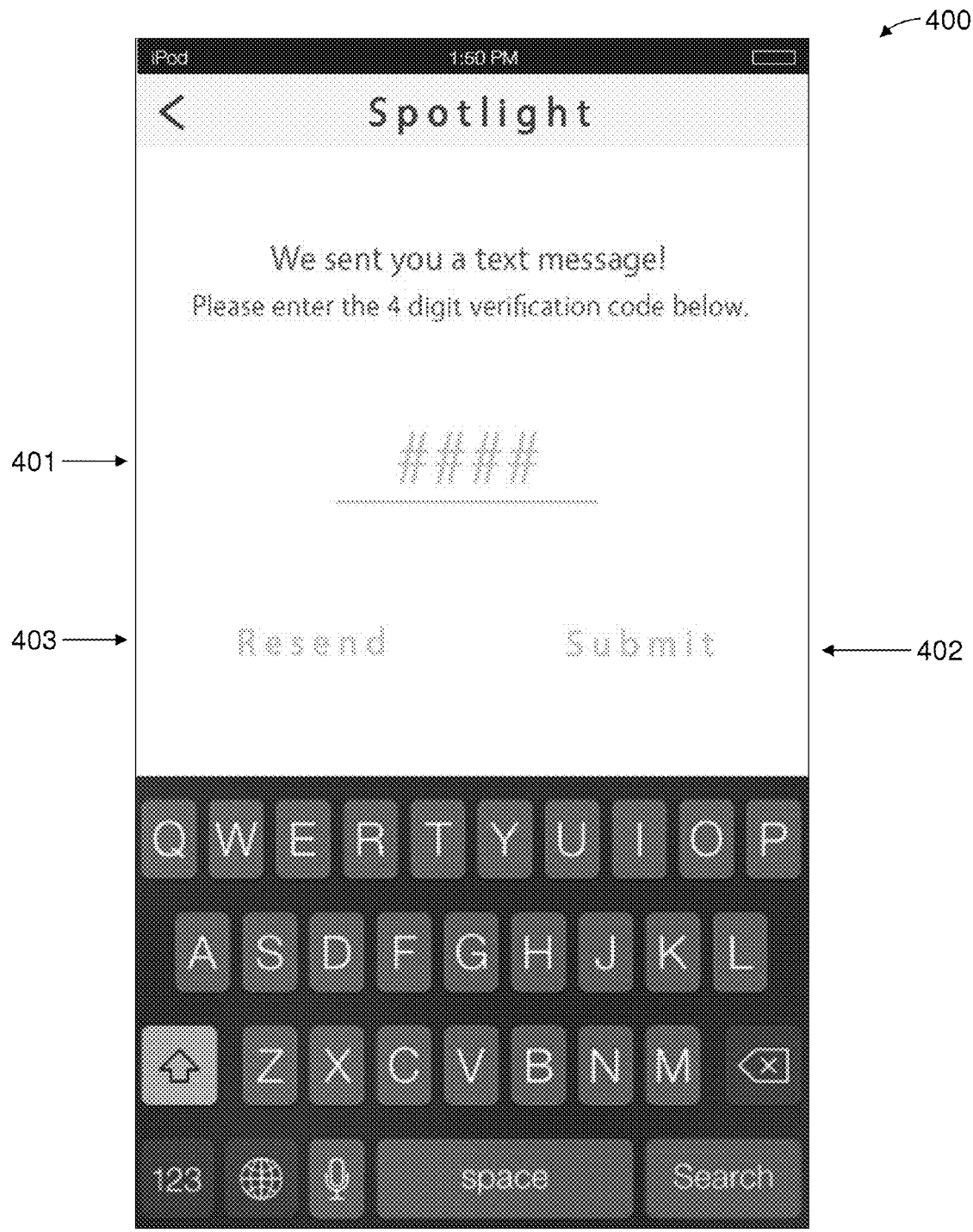
FIG. 4 shows an exemplary screen view of a verification screen, in one embodiment of the invention.
Figure 5:
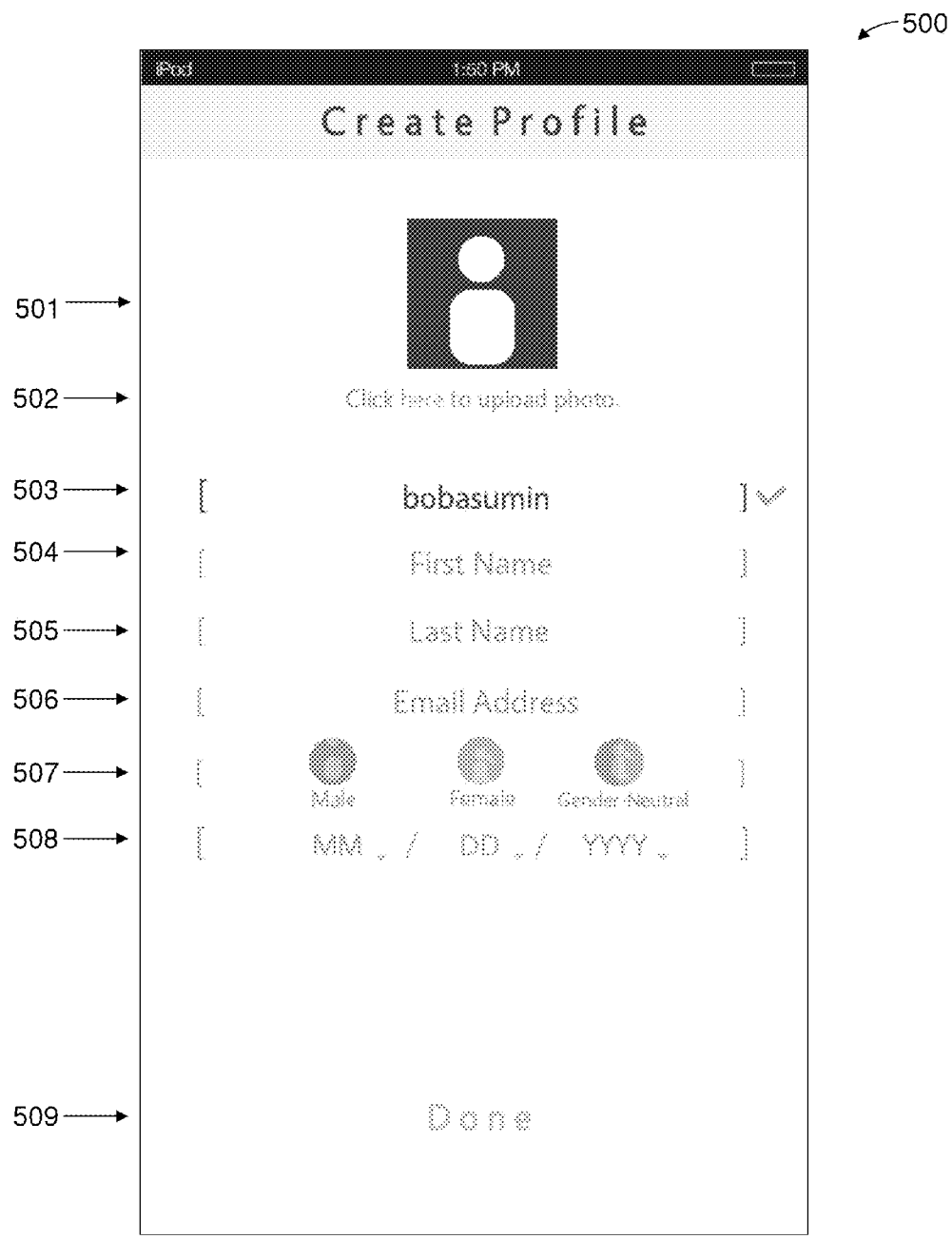
FIG. 5 shows an exemplary screen view of a profile creation screen, in one embodiment of the invention.

FIG. 4 shows an exemplary screen view 400 of a verification screen, in one embodiment of the invention. As shown, the user is informed that a text message containing a 4-digit verification code has just been sent to the phone number that was provided by the user on the preceding screen. The user is prompted with an entry field 401 for providing the verification code. After entering the verification code, the user selects a "Submit" button 402 to verify the identity of the user's mobile device and continue to the profile-creation process, e.g., as shown in FIG. 5. A "Resend" button 403 is provided in the event the user wishes to have the text message containing the verification code resent to the user's mobile device.

FIG. 5 shows an exemplary screen view 500 of a profile creation screen, in one embodiment of the invention. As shown, the user's photo 501, which is initially blank, is displayed at the top. A button 502 is provided for the user to upload a photo from the user's mobile device. An entry field 503 is provided for selecting a user name, and a check mark may appear or disappear adjacent to entry field 503 to indicate whether the proposed user name is available. The user is provided with a first name entry field 504, last name entry field 505, and email address entry field 506. The user is further provided with a radio selection button 507 for selecting a gender (e.g., male, female or gender-neutral). An entry field 508 is provided for selecting the user's birth date. After providing the profile creation information, the user selects the "Done" button 509 to continue to the "Spotlight" screen, e.g., as shown in FIG. 7.

Figure 6:
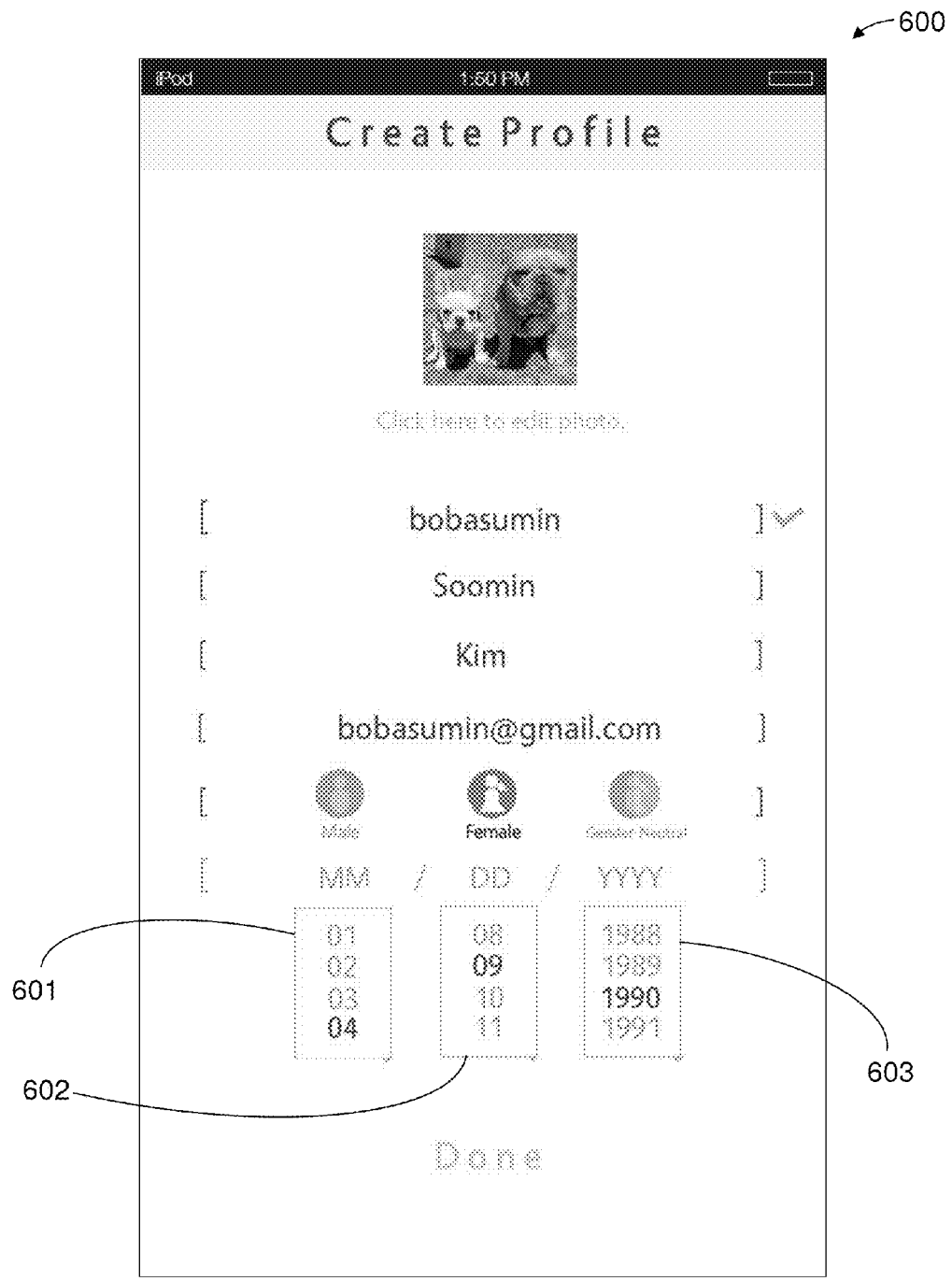
FIG. 6 shows an exemplary screen view of a date selection screen, in one embodiment of the invention.

As shown in the date-selection screen view 600 of FIG. 6, a month selection wheel 601, day selection wheel 602, and year selection wheel 603 may be provided for selecting the user's birth date.

Figure 7:
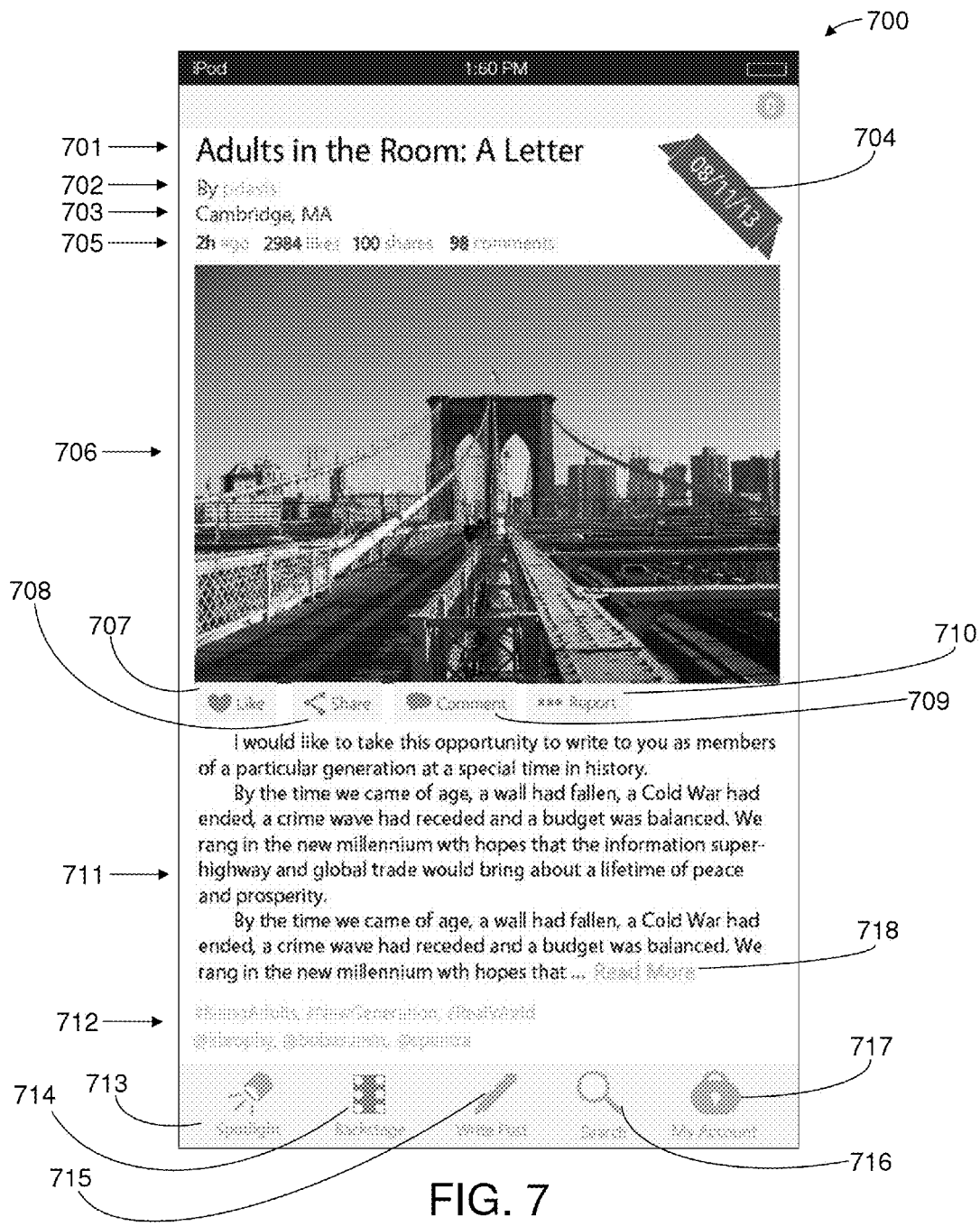
FIG. 7 shows an exemplary screen view of a "Spotlight" post detail screen, in one embodiment of the invention.

FIG. 7 shows an exemplary screen view 700 of a "Spotlight" post detail screen, in one embodiment of the invention. In this embodiment, server 110 has already conducted a lottery and selected, at random, this particular user, who was invited to create this post to display to all of the users of the social media platform during a 24-hour period on this main landing (or showcase, or splash) page of the social media platform, dubbed the "Spotlight" page.

The user's post may include a title 701, identification of the poster 702 (although the user may choose to post anonymously), the user's geographic location 703, and statistical information 705 (including, e.g., the number of hours passed since the post, the number of likes, the number of shares, and the number of comments). A special date banner 704 showing the date posted appears only on Spotlight posts to indicate that the post is currently appearing, or has previously appeared, on a Spotlight page.

The content of the user's post is displayed in a central portion of the Spotlight screen and, in this example, includes a still image 706 and text article 711 uploaded by the user as part of the post.

A "like" button 707 is provided for viewers to indicate a favorable rating for the Spotlight post. A "share" button 708 is provided for viewers to share the Spotlight post with others.

A "Comment" button 709 is provided for viewers to post their own comments about the Spotlight post. After selecting the "Comment" button 709, a user is led to a screen such as screen 900 of FIG. 9.

A "report" button 710 is provided for viewers to report inappropriate posts to a system administrator. A tag-display area 712 is provided to show hashtags and/or usernames selected by the poster as being associated with the post.

Navigation buttons 713, 714, 715, 716, and 717, which appear at the bottom of screen view 700, appear on most other screen views of the social media platform as well, to permit ready access to the main functions of the social media platform, as follows:

A "Spotlight" button 713 and a "Backstage" button 714 are provided at the bottom of the screen for navigating between the Spotlight and Backstage areas, respectively. After selecting the "Backstage" button 714, a user is led to a Backstage area such as screen 1000 of FIG. 10. After selecting the "Spotlight" button 713 (e.g., from a screen view other than screen view 700), a user is led back to a Spotlight screen such as screen 700 of FIG. 7.

A "Write Post" button 715 is provided for composing a new post. After selecting the "Write Post" button 715, a user is led to a screen such as screen 2200 of FIG. 22.

A "Search" button 716 is provided for searching posts. After selecting the "Search" button 716, a user is led to a screen such as screen 1500 of FIG. 15.

A "My Account" button 717 is provided for performing functionality specific to the current user. After selecting the "My Account" button 717, a user is led to a screen such as screen 2600 of FIG. 26.

As shown, a "Read More" button 718 is provided to display to viewers, on additional screens, remaining portions of text that do not fit on the Spotlight screen. After selecting the "Read More" button 718, a user is led to a screen such as screen 800 of FIG. 8.

Figure 8:
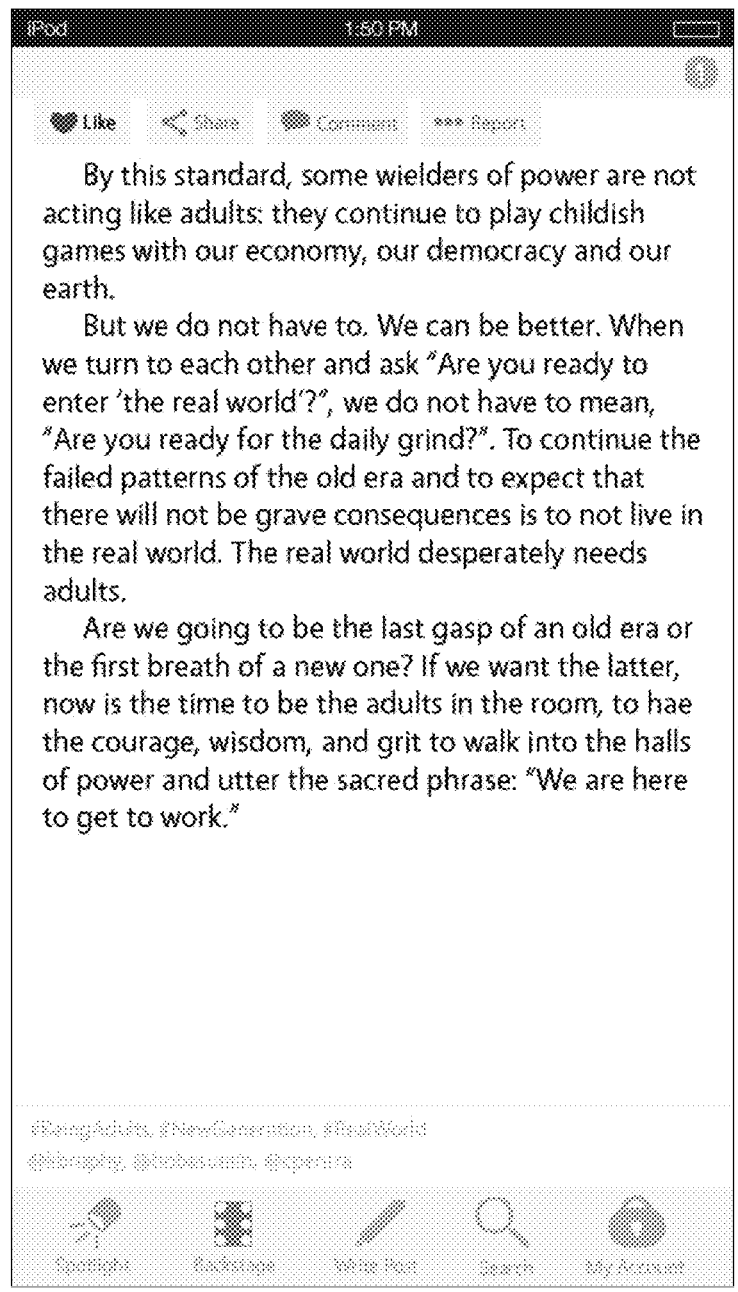
FIG. 8 shows an exemplary screen view of an additional-text screen, in one embodiment of the invention.

FIG. 8 shows an exemplary screen view 800 of an additional-text screen, in one embodiment of the invention. As shown, a text view portion 801 is provided for showing text that flows beyond the viewable area of the Spotlight screen. Most non-text elements are removed, so that the display of text can be maximized within the screen view.

Figure 9:
FIG. 9 shows an exemplary screen view of a comment screen, in one embodiment of the invention.

FIG. 9 shows an exemplary screen view 900 of a comment screen, in one embodiment of the invention. As shown, a comment-display area 901 is provided for showing existing comments, along with photographs and usernames of the corresponding comment posters and times showing how recently the comments were posted. A comment-entry area 902 is provided for new comments to be posted by the current user.

Figure 10:
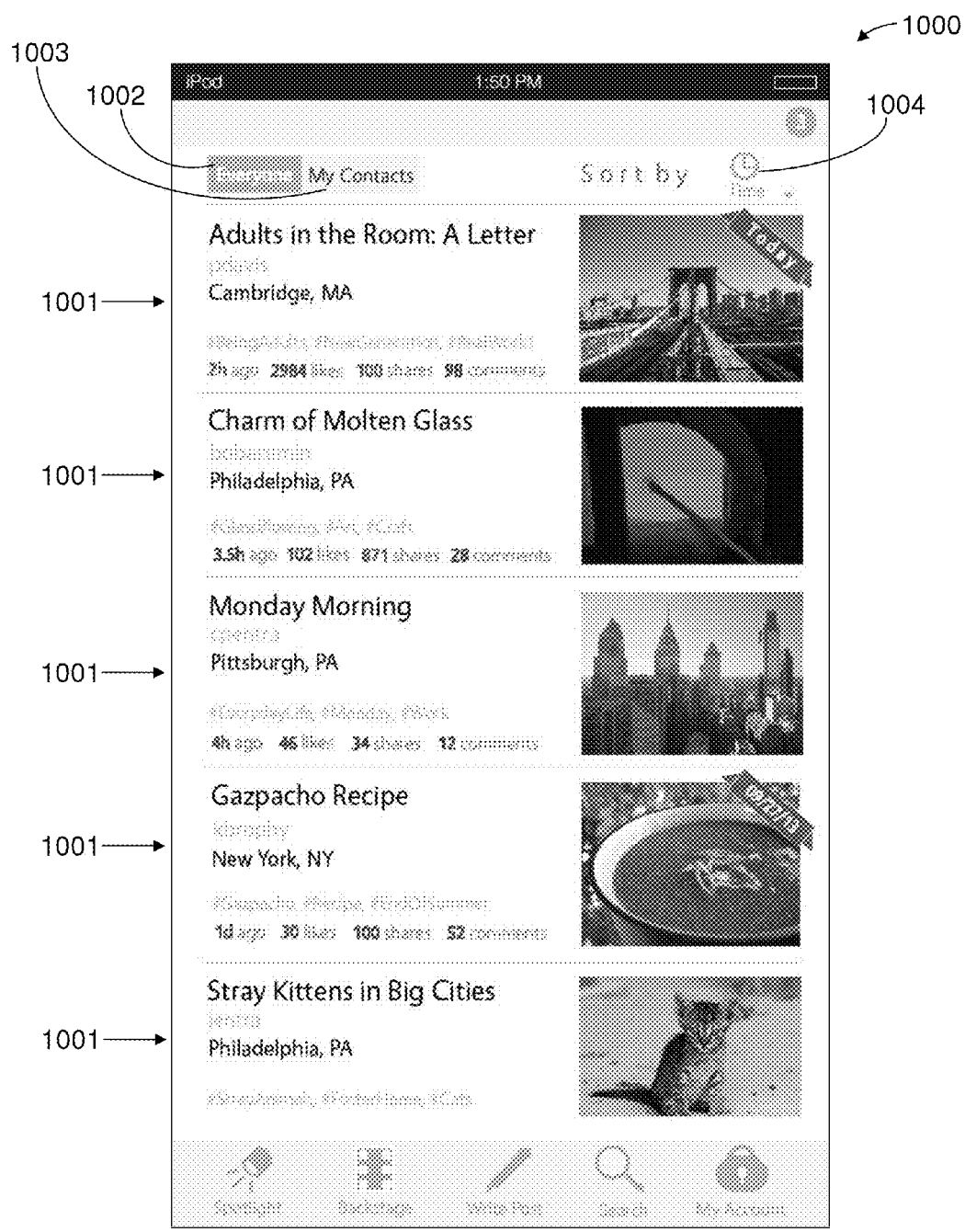
FIG. 10 shows an exemplary screen view of a Backstage area summary display screen, in one embodiment of the invention.

FIG. 10 shows an exemplary screen view 1000 of a Backstage summary display screen, in one embodiment of the invention. As shown, a plurality of summaries 1001 are displayed, with each summary 1001 identifying a different post. An "Everyone" button 1002 is provided to show posts from all users of the social media platform, and a "My Contacts" button 1003 is provided to filter posts so that only posts from contacts of the current user are shown. A "Sort By" drop-down button 1004 is provided to permit sorting posts by various criteria, including, e.g., date and time, number of "likes," number of shares, number of comments, number of views, and the like, as shown more specifically in the examples of FIGS. 11-13.

Figure 11:
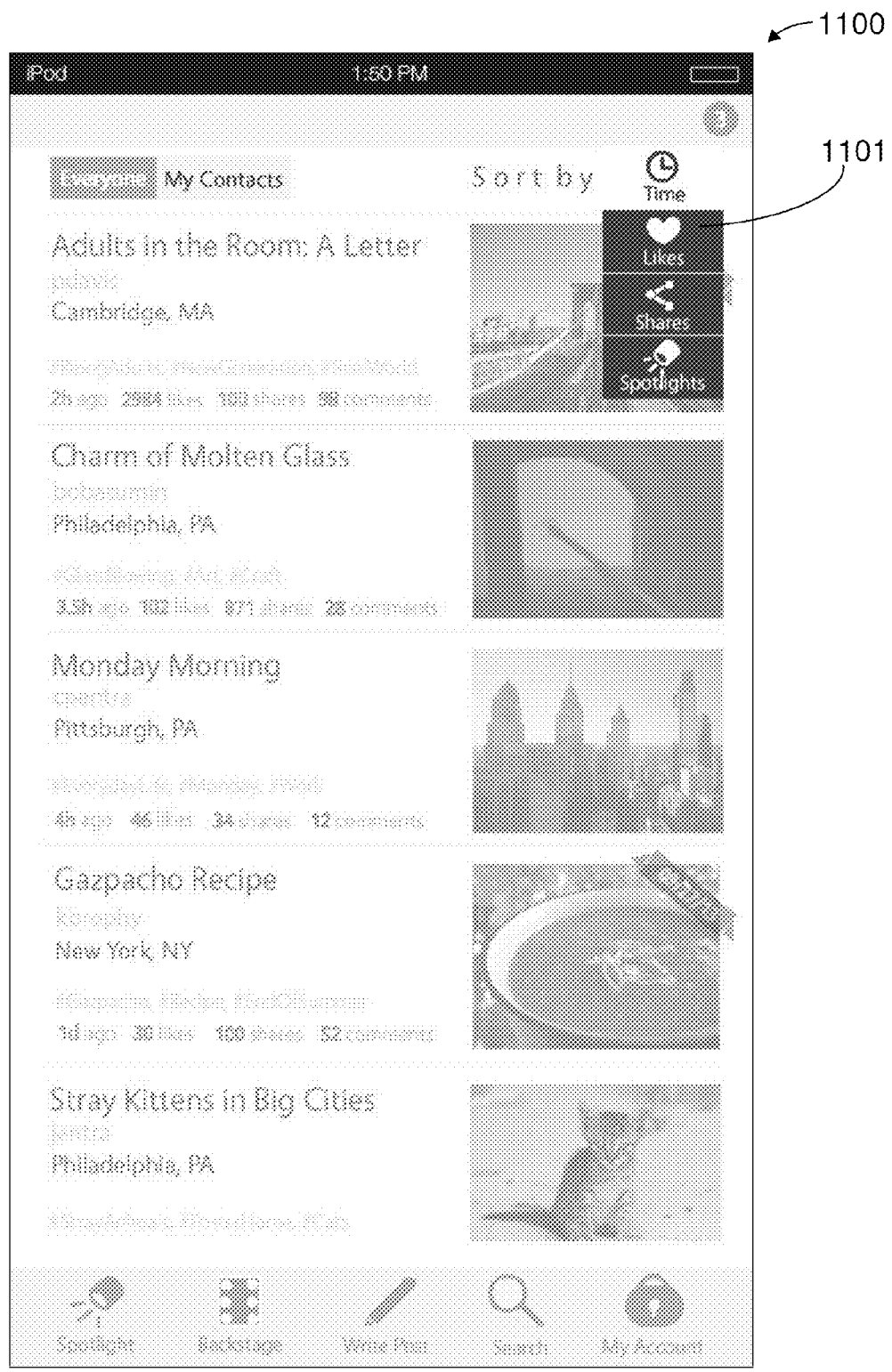
FIG. 11 shows an exemplary screen view of a Backstage area summary display screen, in one embodiment of the invention.

FIG. 11 shows an exemplary screen view 1100 of a Backstage area summary display screen, in one embodiment of the invention. In this example, the user has selected the "Sort By" drop-down button 1004, and the user is presented with an additional drop-down button bar 1101 with different sort criteria from which to select, i.e., sort by time/date posted, sort by number of likes, sort by number of shares, and sort by Spotlights (i.e., display posts that have previously appeared on the "Spotlight" page as being higher ranked in the sort order).

Figure 12:
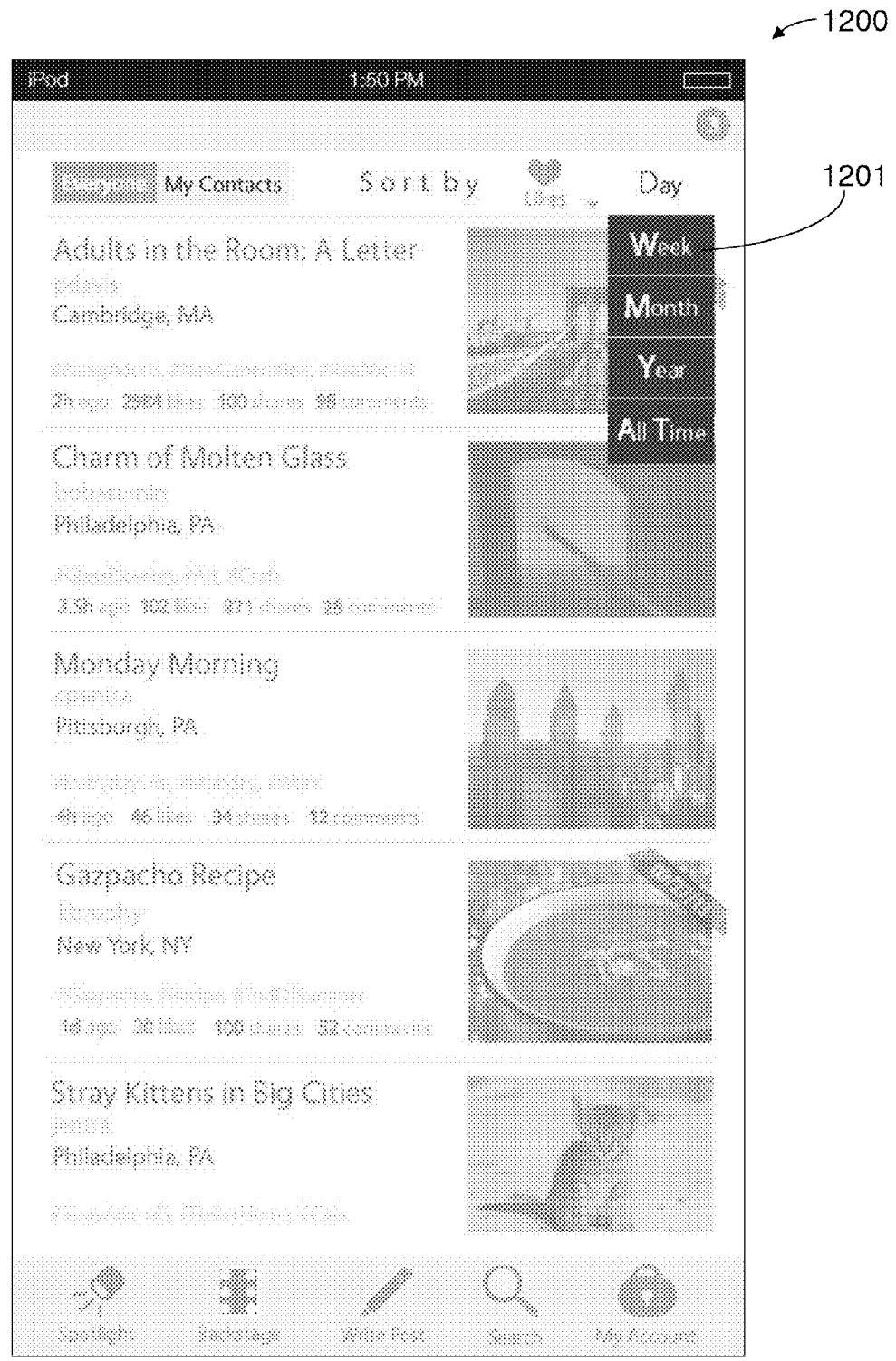
FIG. 12 shows an exemplary screen view of a Backstage area summary display screen, in one embodiment of the invention.

FIG. 12 shows an exemplary screen view 1200 of a Backstage area summary display screen, in one embodiment of the invention. In this example, the user has selected the "Sort By" drop-down button 1004, and has chosen to sort by time/date posted. The user is then presented with an additional drop-down button bar 1201 with different sort criteria from which to select, i.e., sort by day, week, month, year, or all-time.

Figure 13:
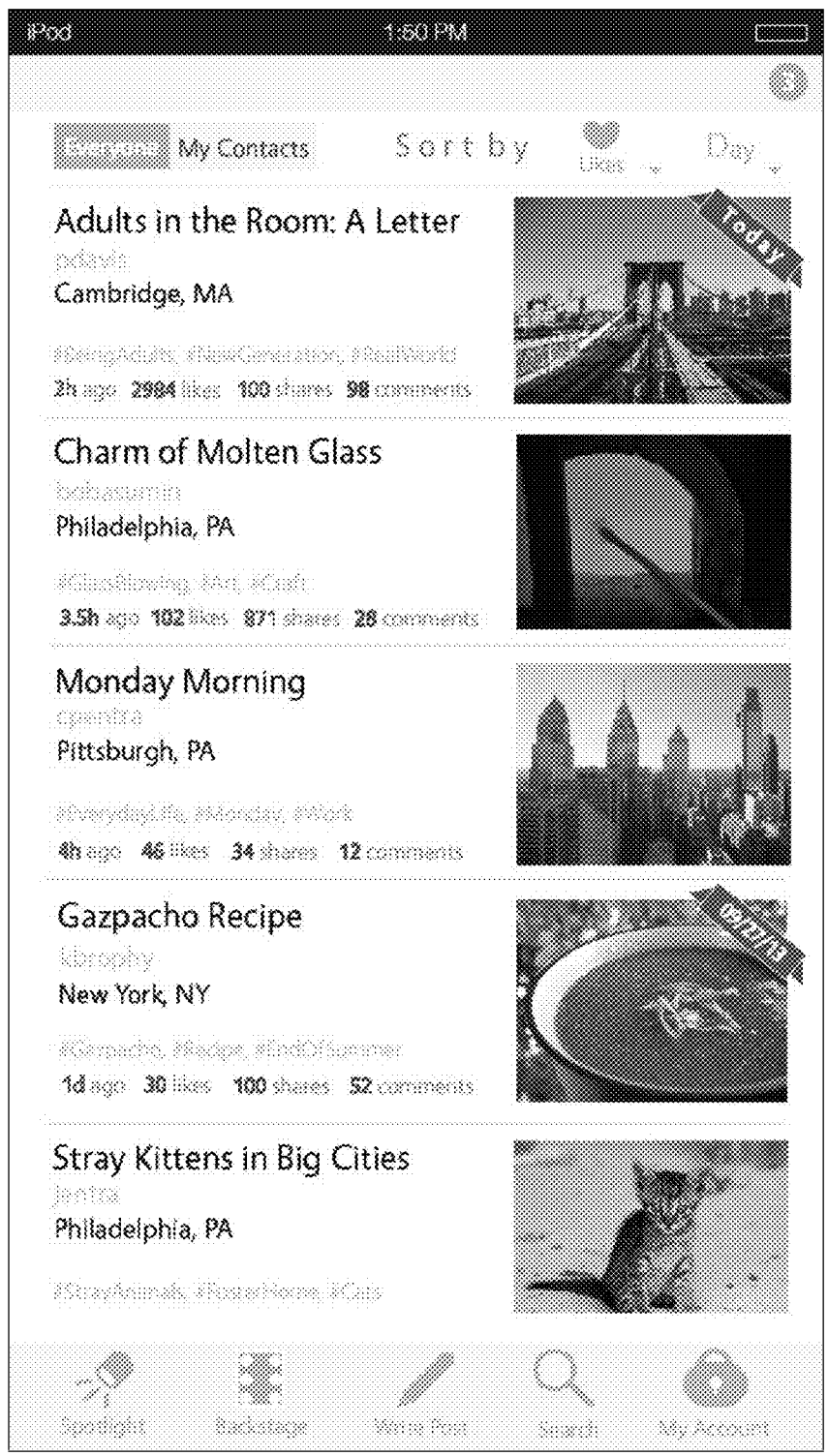
FIG. 13 shows an exemplary screen view of a Backstage area summary display screen, in one embodiment of the invention.

FIG. 13 shows an exemplary screen view 1300 of a Backstage area summary display screen, in one embodiment of the invention. In this example, the user has selected the "Sort By" drop-down button 1004, and has chosen to sort by "likes." As shown, the posts are sorted in order of most "likes" received, with the post receiving the most "likes" appearing at the top of the screen.

Figure 14:
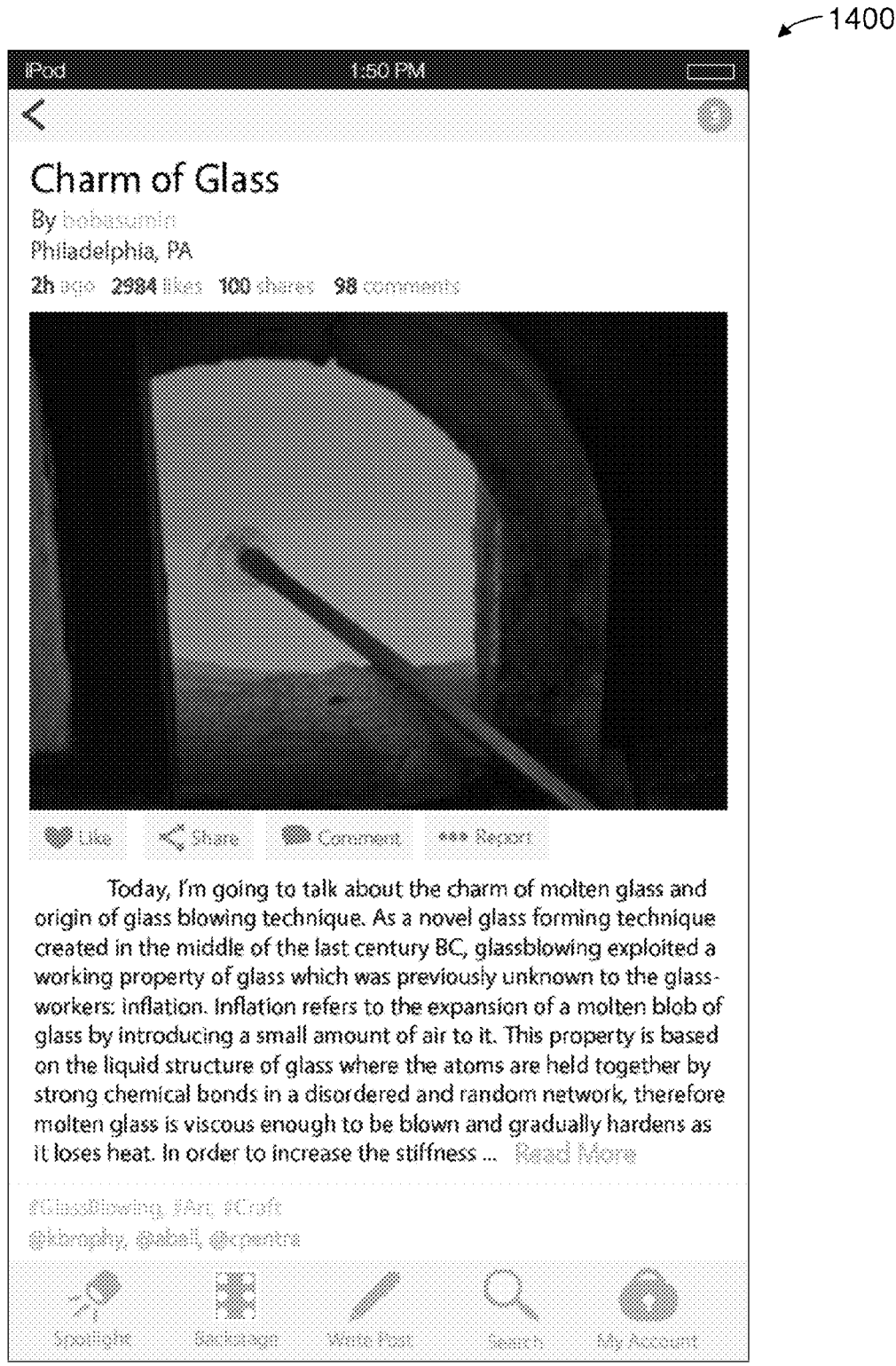
FIG. 14 shows an exemplary screen view of a Backstage area post detail screen, in one embodiment of the invention.

FIG. 14 shows an exemplary screen view 1400 of a Backstage area post detail screen, in one embodiment of the invention. Screen view 1400 is substantially the same as screen view 700 of FIG. 7, except that special date banner 704 indicating a Spotlight post is not present in screen view 1400, because this post has never appeared on the Spotlight page.

Figure 15:
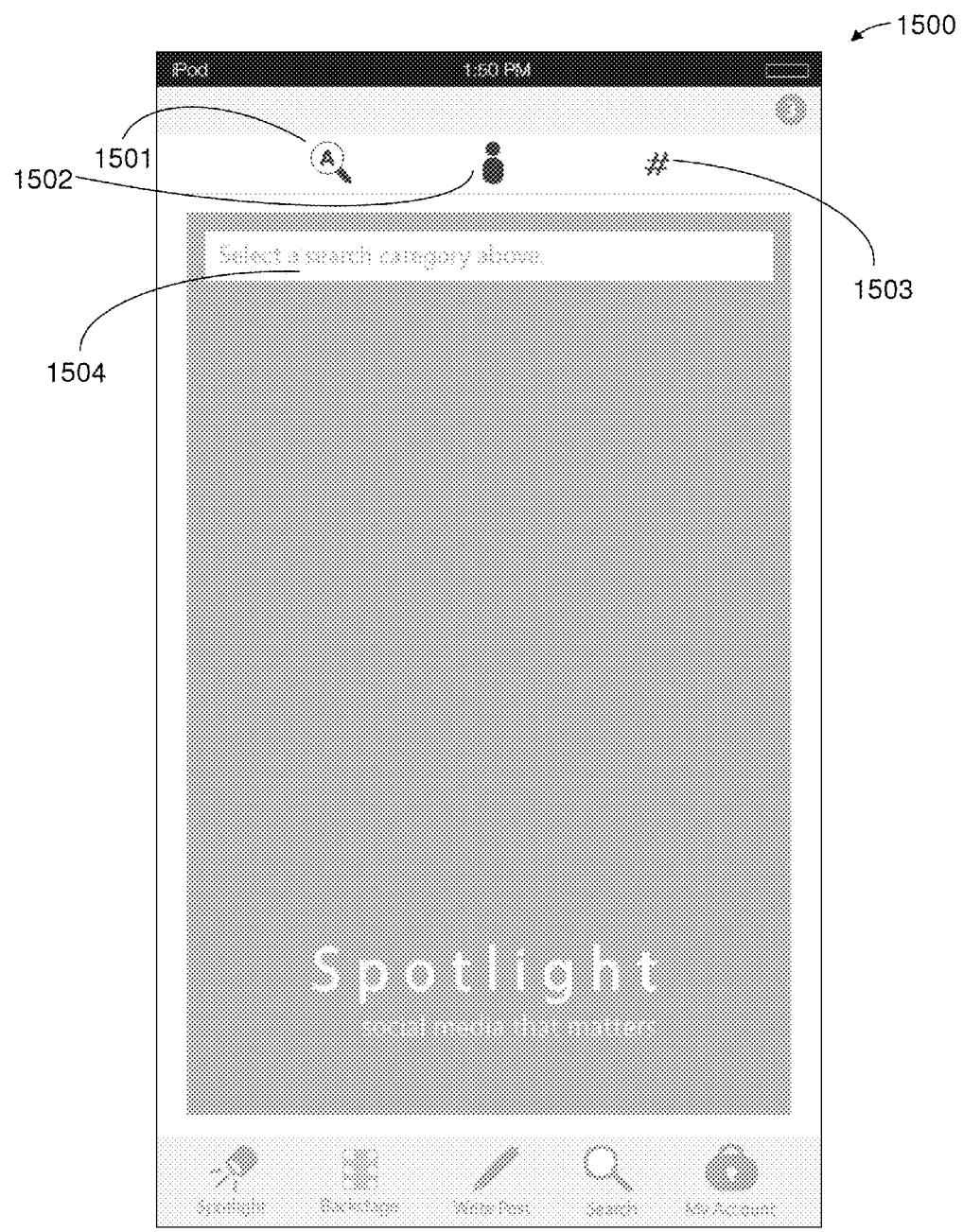
FIG. 15 shows an exemplary screen view of a "Search" screen, in one embodiment of the invention.

FIG. 15 shows an exemplary screen view 1500 of a "Search" screen, in one embodiment of the invention. As shown, three buttons are provided for selecting search criteria: a text-search button 1501, a people-search button 1502, and a hashtag-search button 1503. The user selects one of the three buttons and enters text in a text-entry field 1504 to initiate a search within the contents and/or metadata of posts. After selecting the text-search button 1501, a user is led to a screen such as screen 1600 of FIG. 16. After selecting the people-search button 1502, a user is led to a screen such as screen 1700 of FIG. 17. After selecting the hashtag-search button 1503, a user is led to a screen such as screen 1900 of FIG. 19.

Figure 16:
FIG. 16 shows an exemplary screen view of a text-search screen, in one embodiment of the invention.

FIG. 16 shows an exemplary screen view 1600 of a text-search screen, in one embodiment of the invention. As shown, the user is prompted to enter either the title of a post or one or more keywords into a text-entry field 1601 to search within the contents and/or metadata of posts, so that posts containing either the provided title or keyword(s) of interest are returned as search results.

Figure 17:
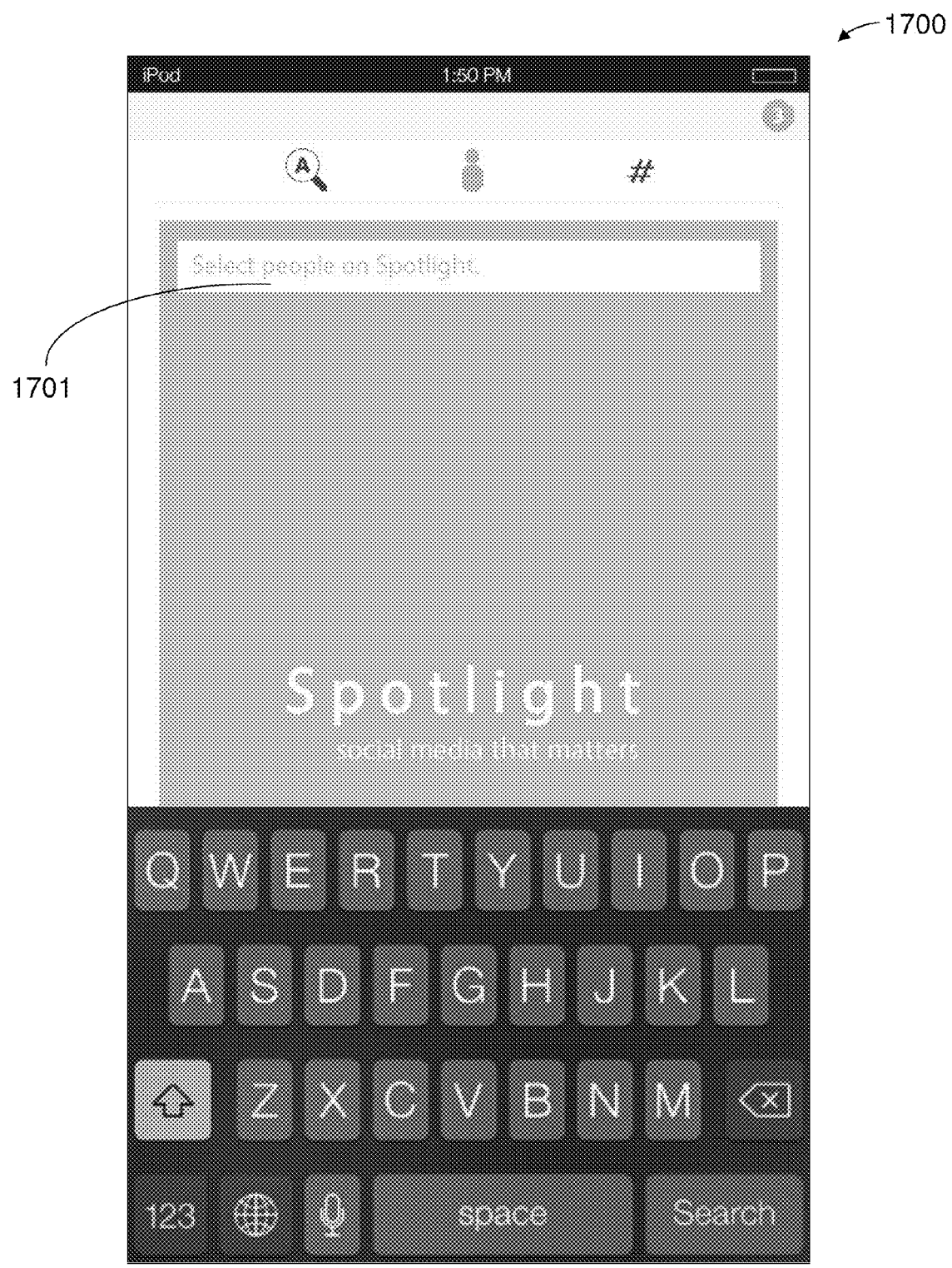
FIG. 17 shows an exemplary screen view of a people-search screen, in one embodiment of the invention.

FIG. 17 shows an exemplary screen view 1700 of a people-search screen, in one embodiment of the invention. As shown, the user is prompted to enter part or all of one or more names or usernames into a text-entry field 1701 to search within the contents and/or metadata of posts, so that posts from one or more particular users are returned as search results.

Figure 18:
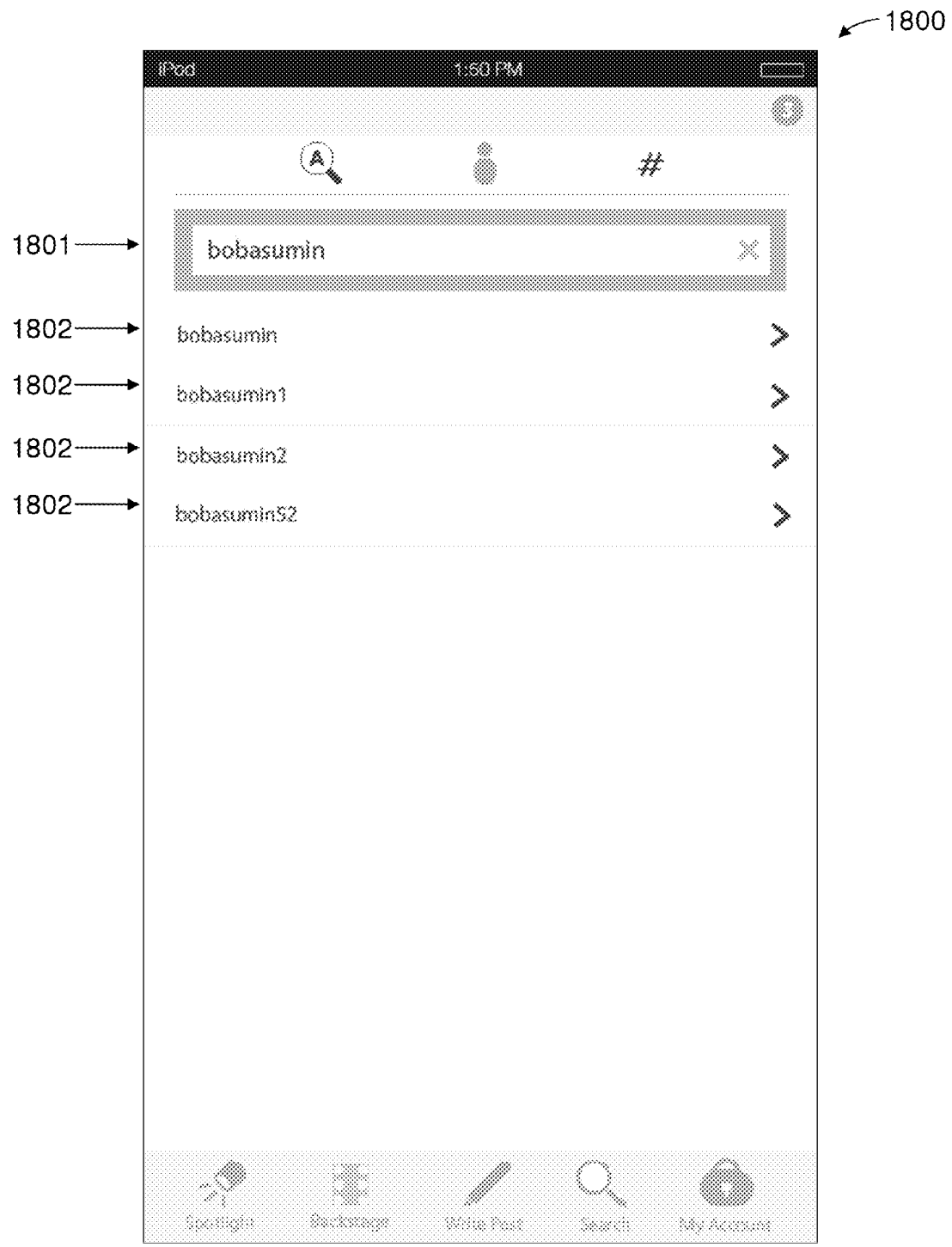
FIG. 18 shows an exemplary screen view of a people-search results screen, in one embodiment of the invention.

FIG. 18 shows an exemplary screen view 1800 of a people-search results screen, in one embodiment of the invention. As shown, the user has entered a partial username as a search keyword into text-entry field 1801, and server 110 has returned, as search results, four different posters 1802 in the social media platform whose usernames contain the partial username that was searched. From this screen, the user can select any one of those four posters to view that poster's posts.

Figure 19:
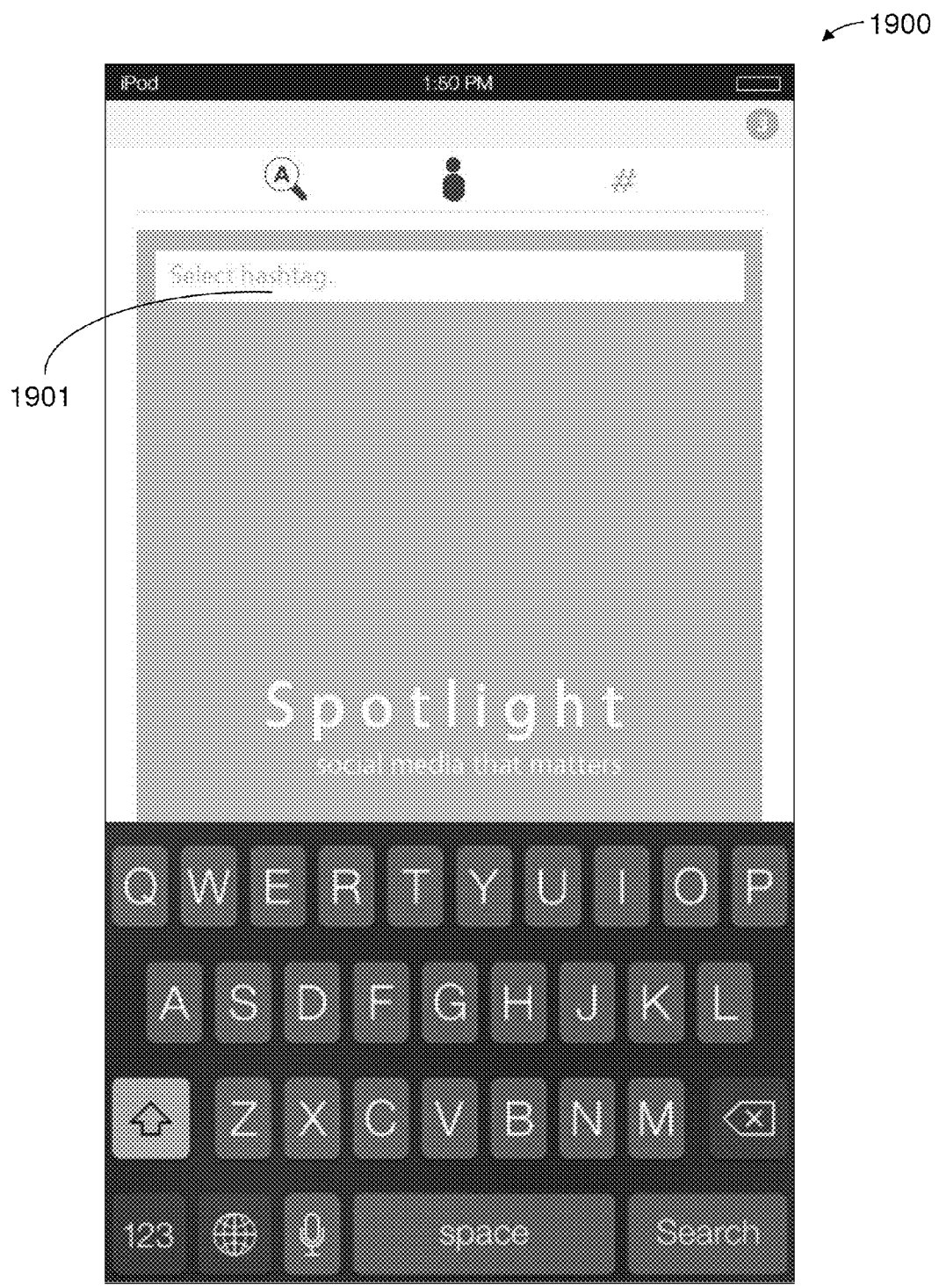
FIG. 19 shows an exemplary screen view of a hashtag-search screen, in one embodiment of the invention.

FIG. 19 shows an exemplary screen view 1900 of a hashtag-search screen, in one embodiment of the invention. As shown, the user is prompted to enter a hashtag into a text-entry field 1901 to search within the contents and/or metadata of posts, so that posts containing the provided hashtag are returned as search results.

Figure 20:
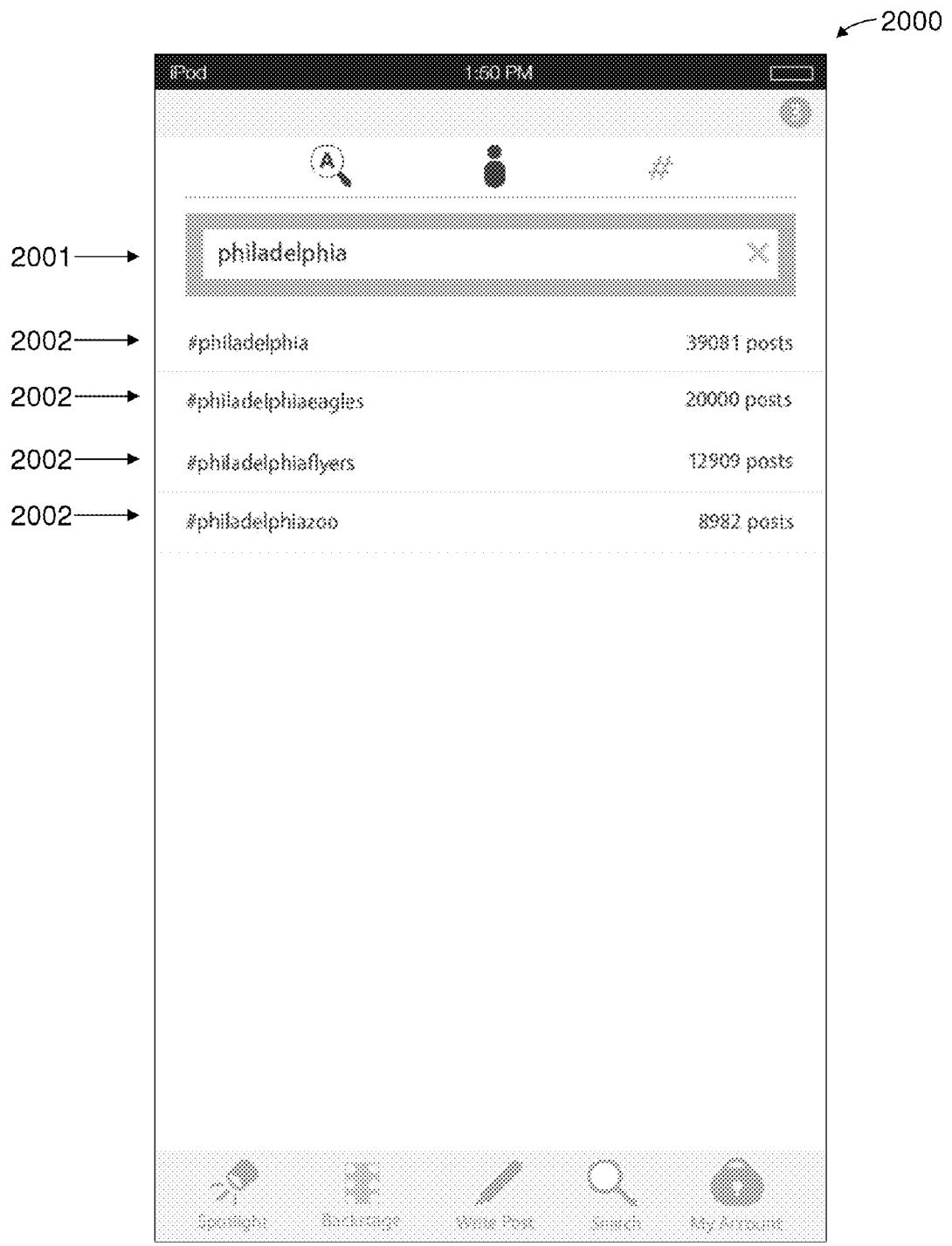
FIG. 20 shows an exemplary screen view of a hashtag-search results screen, in one embodiment of the invention.

FIG. 20 shows an exemplary screen view 2000 of a hashtag-search results screen, in one embodiment of the invention. As shown, the user has entered a search keyword into text-entry field 2001, and server 110 has returned, as search results, four different hashtags 2002 in the social media platform containing the keyword that was searched. From this screen, the user can select any one of those four hashtags to view all posts containing and/or associated with that hashtag.

Figure 21:
FIG. 21 shows an exemplary screen view of a hashtag-search results summary display screen, in one embodiment of the invention.

FIG. 21 shows an exemplary screen view 2100 of a hashtag-search results summary display screen, in one embodiment of the invention. In this scenario, the user has entered a search keyword into text-entry field 2001, server 110 has returned four different hashtags as search results, and the user has selected one of those hashtags. The resulting display is screen view 2100, which shows summaries of the two posts 2101 in the social media platform containing the selected hashtag. From this screen, the user can select either of the two posts to view the contents of the post.

Figure 22:
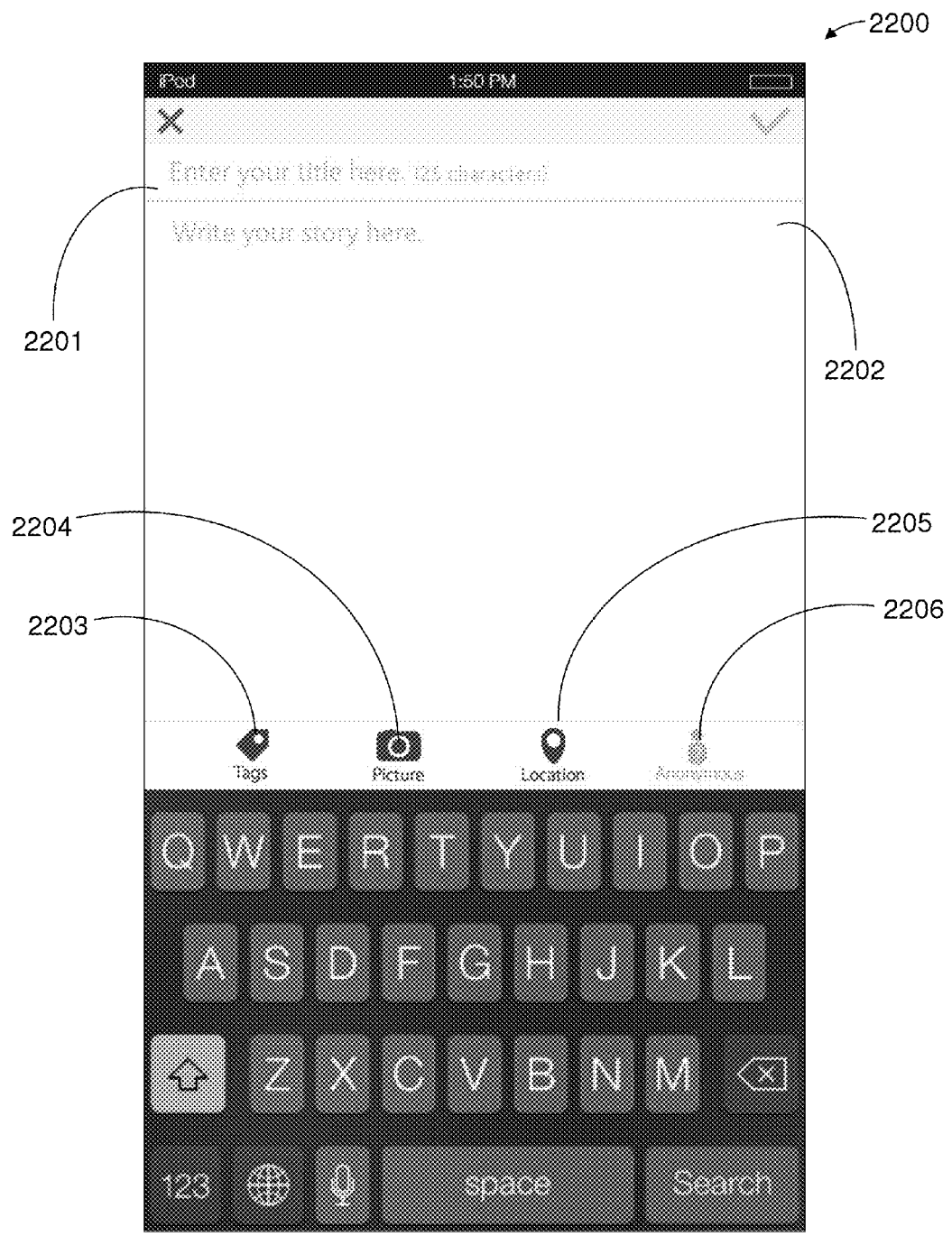
FIG. 22 shows an exemplary screen view of a post-creation screen, in one embodiment of the invention.

FIG. 22 shows an exemplary screen view 2200 of a post-creation screen, in one embodiment of the invention.

On this screen, the user enters and/or uploads the data that will become the contents of the post. The post includes a title field 2201 and a text body field 2202. A "Tags" button 2203 is provided for the poster to enter hashtags and/or usernames selected by the poster as being associated with the post. After selecting the "Tags" button 2203, a user is led to a screen such as screen 2400 of FIG. 24. A "Picture" button 2204 is provided for the poster to upload an image file (such as a photograph, drawing, or painting) from the user's mobile device (in other embodiments, this file could contain video, a multimedia presentation, or other type of data). A "Location" button 2205 is provided for the poster to include the poster's geographic location to be included as metadata along with the post. This location can be specified either manually, such as by the user typing the name of a city, or alternatively, the mobile device can automatically provide this data, as may be available through user permissions, e.g., via GPS-supplied coordinates. An "Anonymous" button 2206 is provided for the poster to select that the post be made anonymous, in which case other users can still view the post but cannot see the identity of the poster. The anonymity of a post or poster does not affect the ranking or rating of the post or the poster, nor the qualification of the poster to be a winner.

Figure 23:
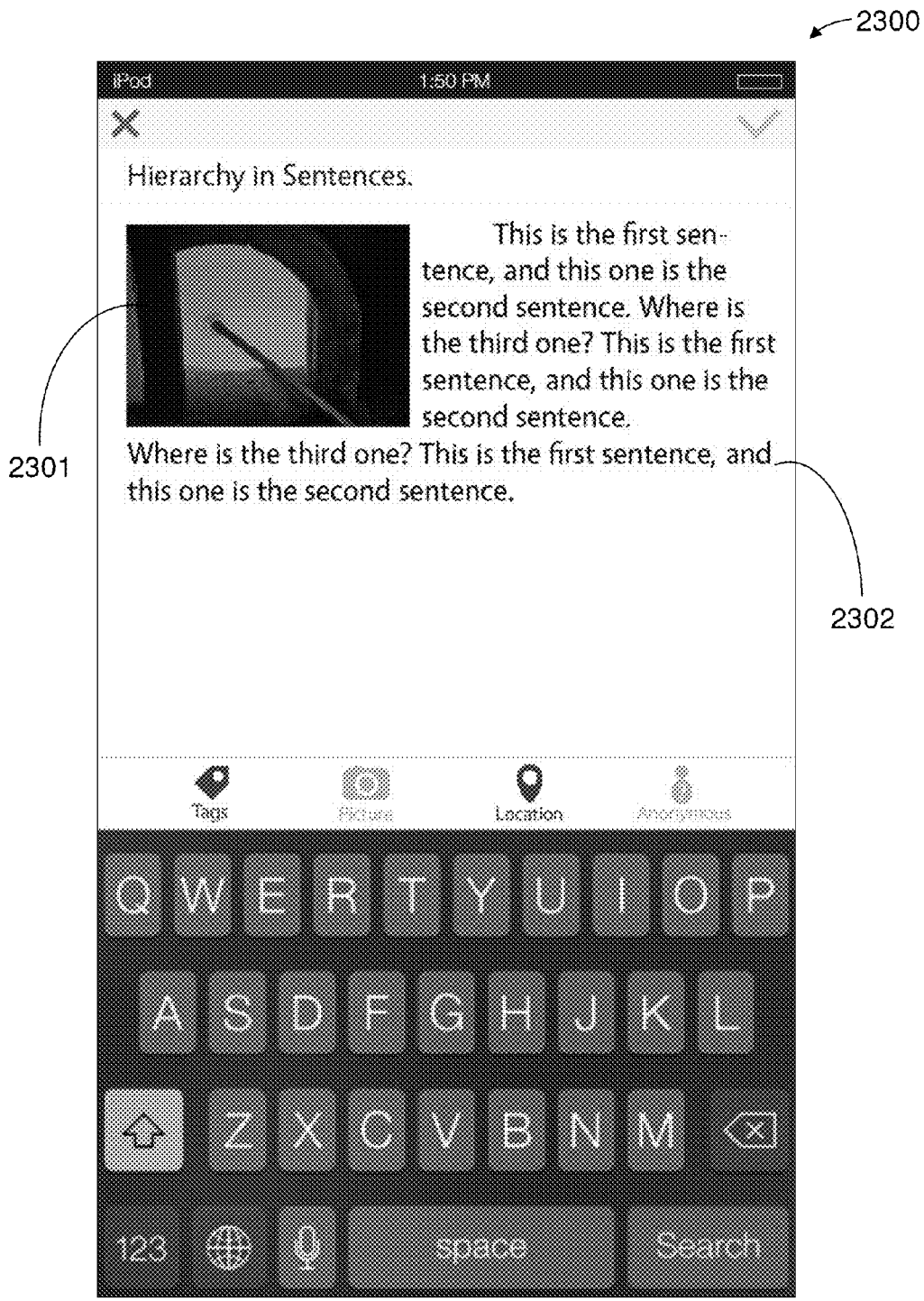
FIG. 23 shows an exemplary screen view of a post-creation screen after a photograph has been uploaded, in one embodiment of the invention.

FIG. 23 shows an exemplary screen view 2300 of a post-creation screen after a photograph has been uploaded, in one embodiment of the invention. As shown, once a photograph has been uploaded, the photograph 2301 appears inline within text-creation screen 2302. Although, in this embodiment, a post can include only a single image and a single portion of text, it should be understood that, in other embodiments, posts may include other types of content and may or may not have limitations with regard to the types and amounts of content permitted for a user, for a post, and for a given period of time.

Figure 24:
FIG. 24 shows an exemplary screen view of a hashtag-entry screen, in one embodiment of the invention.

FIG. 24 shows an exemplary screen view 2400 of a hashtag-entry screen, in one embodiment of the invention. In this scenario, the user has selected the "Tags" button to indicate that the user has one or more hashtags and/or usernames that the user wishes to associate with the post that the user is creating. A hashtag-entry field 2401 is provided for the user to enter one or more hashtags to associate with the user's post (one or more hashtags may alternatively or additionally be embedded within title and/or text portions of the user's post, in certain embodiments of the invention). A username-entry field 2402 is provided for the user to enter one or more usernames of other users to associate with the user's post. The user selects the "Done" button 2403 when entry of hashtags and/or usernames is complete.

Figure 25:
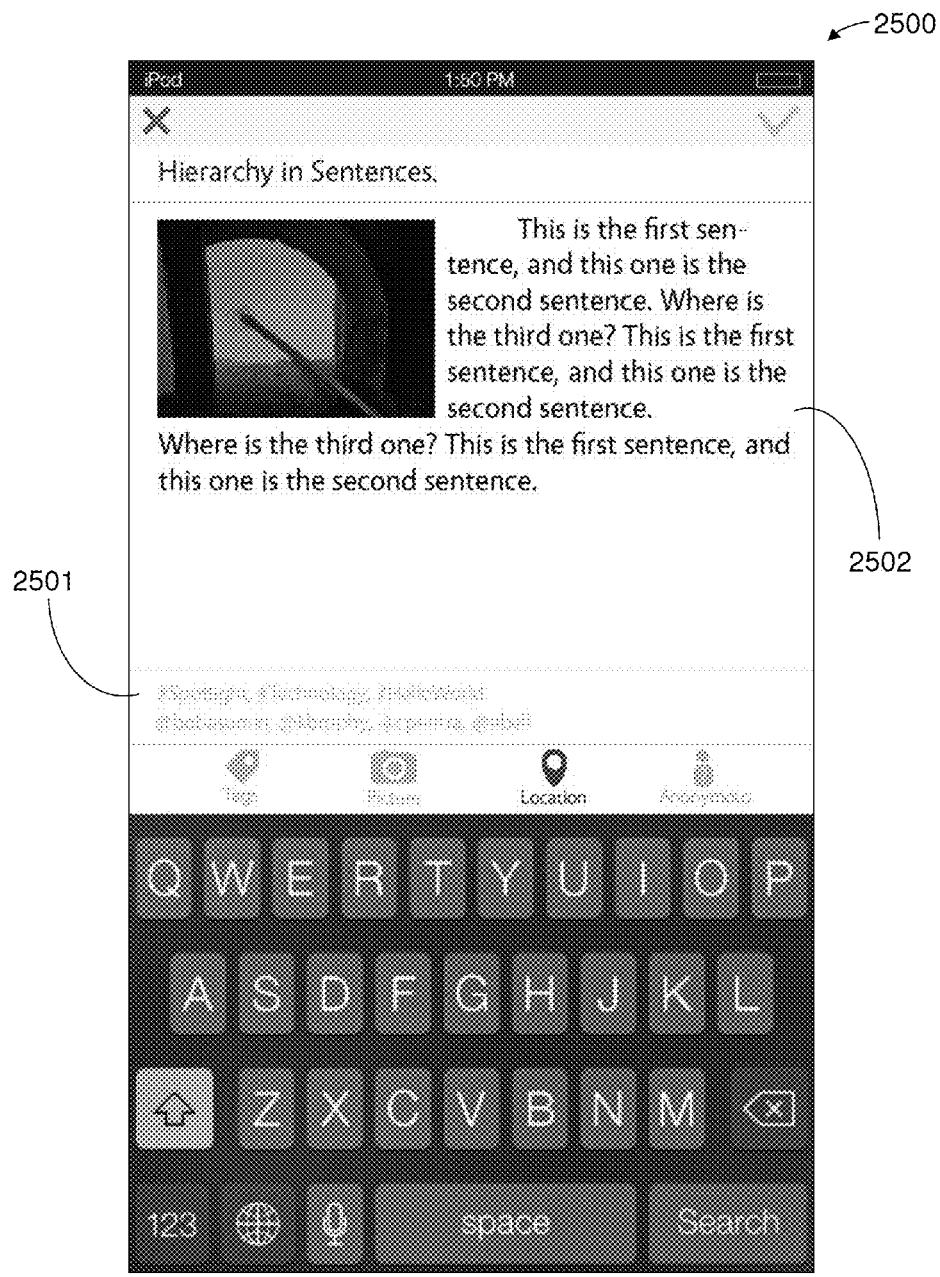
FIG. 25 shows an exemplary screen view of a post-creation screen after hashtags and usernames have been associated with a post, in one embodiment of the invention.

FIG. 25 shows an exemplary screen view 2500 of a post-creation screen after hashtags and usernames have been associated with a post, in one embodiment of the invention. As shown, once hashtags and/or usernames have been provided by the poster, those hashtags and/or usernames appear in a tag-display area 2501 below text-creation screen 2502.

Figure 26:
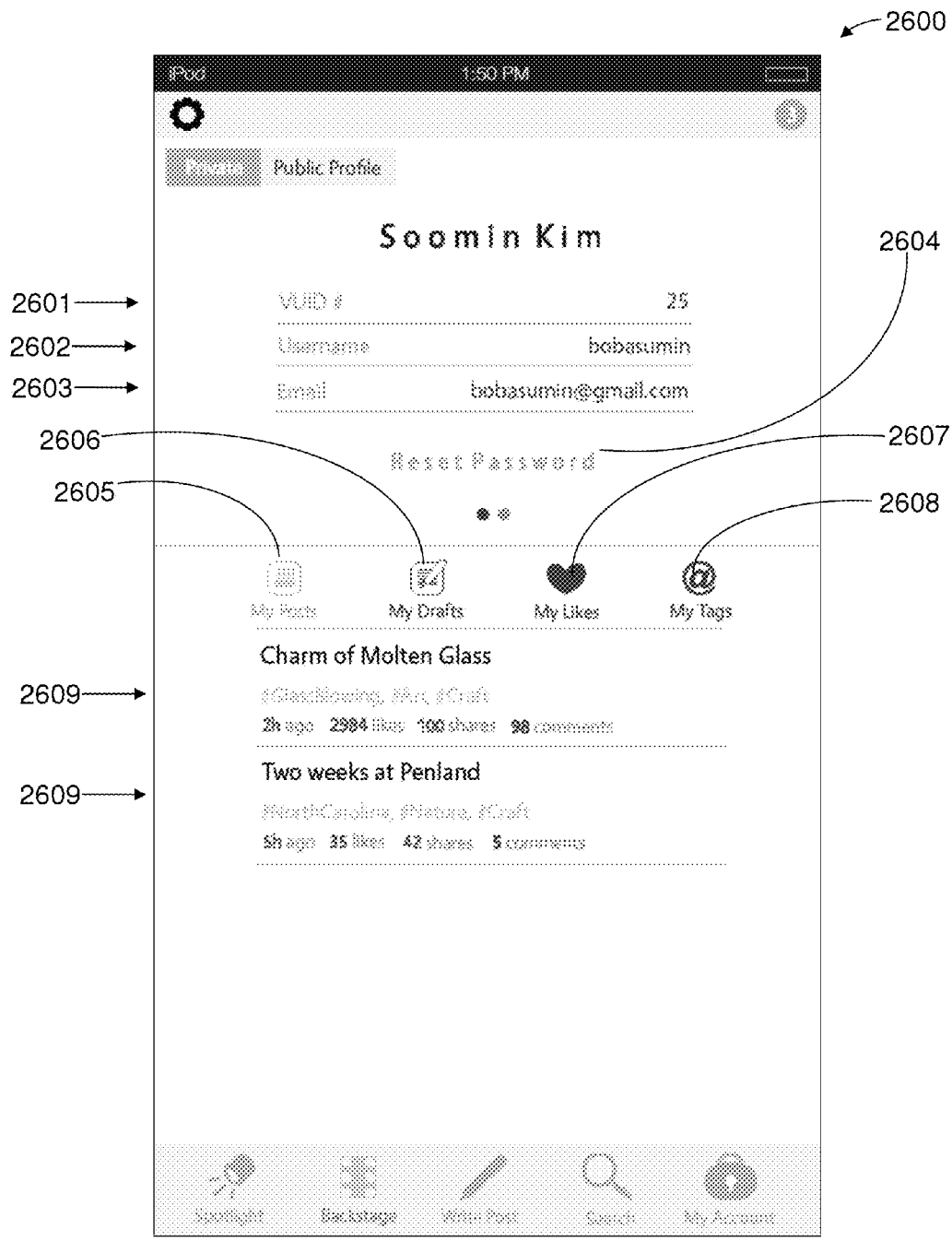
FIG. 26 shows an exemplary screen view of a "My Account" screen, in one embodiment of the invention.

FIG. 26 shows an exemplary screen view 2600 of a "My Account" screen, in one embodiment of the invention. As shown, display fields are provided for a unique numeric identification number 2601 (or VUID number) preassigned by server 110, username 2602, and email address 2603. In the event the user wishes to reset his or her password, a password-reset button 2604 is provided to lead the user to a password-reset procedure.

Navigation buttons 2605, 2606, 2607, and 2608, which appear in the middle of screen view 2600, appear on other screen views of the "My Account" portion of the social media platform as well, to permit ready access to the main "My Account" (i.e., user-specific) functions of the social media platform, as follows:

A "My Posts" button 2605 is provided for displaying a list of all content posted by the user. After selecting the "My Posts" button 2605 (e.g., from a screen view other than screen view 2600), a user is led to a screen such as screen 2600 of FIG. 26.

A "My Drafts" button 2606 is provided for displaying a list of all drafts in progress currently being composed by the user. After selecting the "My Drafts" button 2606, a user is led to a screen such as screen 2700 of FIG. 27.

Figure 28:
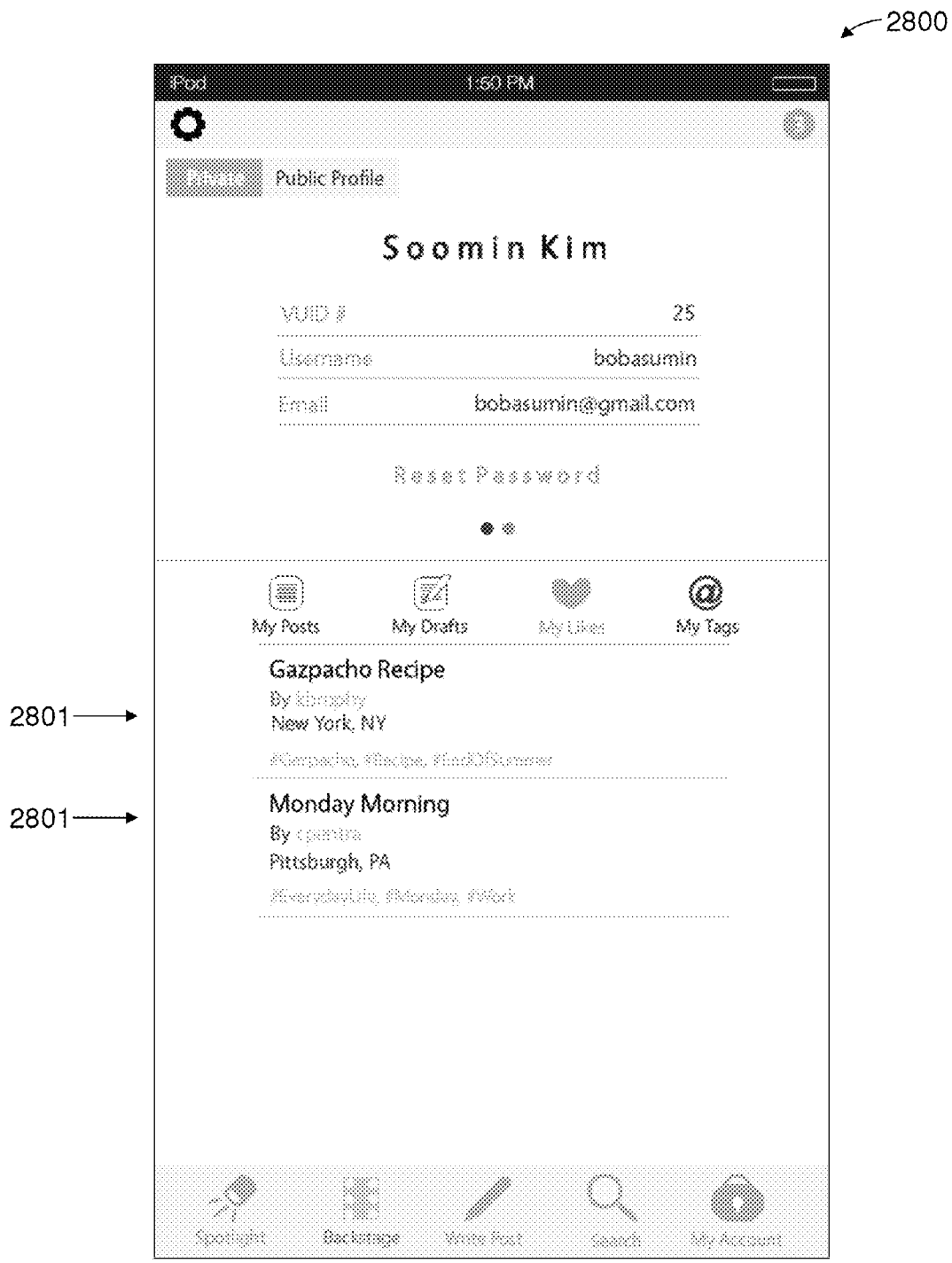
FIG. 28 shows an exemplary screen view of a "My Likes" summary display screen, in one embodiment of the invention.

A "My Likes" button 2607 is provided for displaying a list of all posts that the user has "liked." After selecting the "My Likes" button 2607, a user is led to a screen such as screen 2800 of FIG. 28.

A "My Tags" button 2608 is provided for displaying a list of all posts containing hashtags matching hashtags contained within the user's own posts or are associated with the current user's username. After selecting the "My Tags" button 2608, a user is led to a screen such as screen 2900 of FIG. 29.

Screen view 2600 also shows summaries 2609 of the two posts that are the user's own posts (i.e., "My Posts"). From this screen, the user can select either of the two posts to view the contents of the post.

Figure 27:
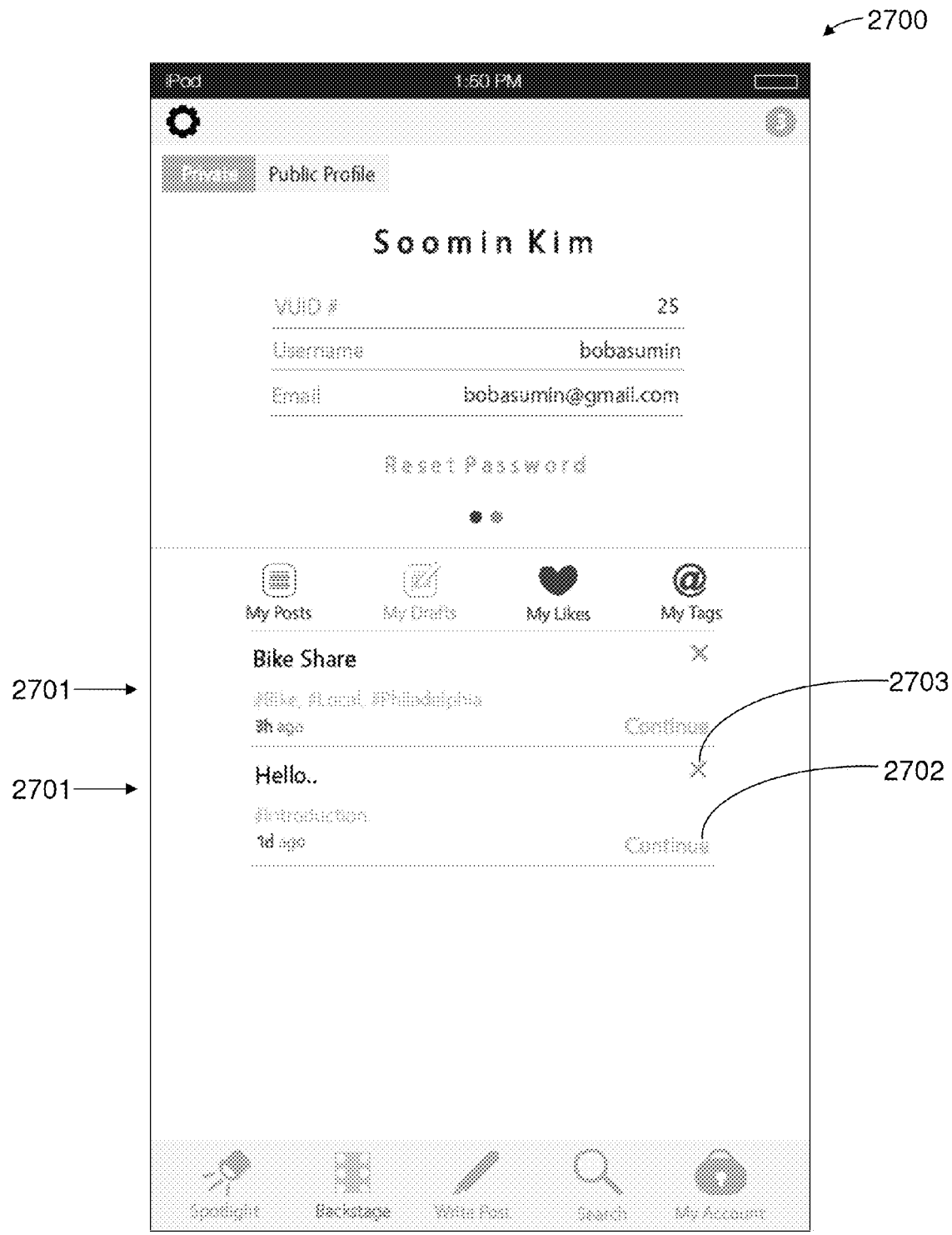
FIG. 27 shows an exemplary screen view of a "My Drafts" summary display screen, in one embodiment of the invention.

FIG. 27 shows an exemplary screen view 2700 of a "My Drafts" summary display screen, in one embodiment of the invention. Screen view 2700 shows summaries 2701 of the two posts that are drafts in progress (i.e., "My Drafts"). From this screen, the user can select a "Continue" button 2702 on either of the two drafts to resume editing the contents of the corresponding draft in progress in preparation for posting, or select an "x" button 2703 to delete the corresponding draft in progress.

FIG. 28 shows an exemplary screen view 2800 of a "My Likes" summary display screen, in one embodiment of the invention. Screen view 2800 shows summaries 2801 of the two posts that the user has "liked" (i.e., "My Likes"). From this screen, the user can select either of the two posts to view the contents of the post.

Figure 29:
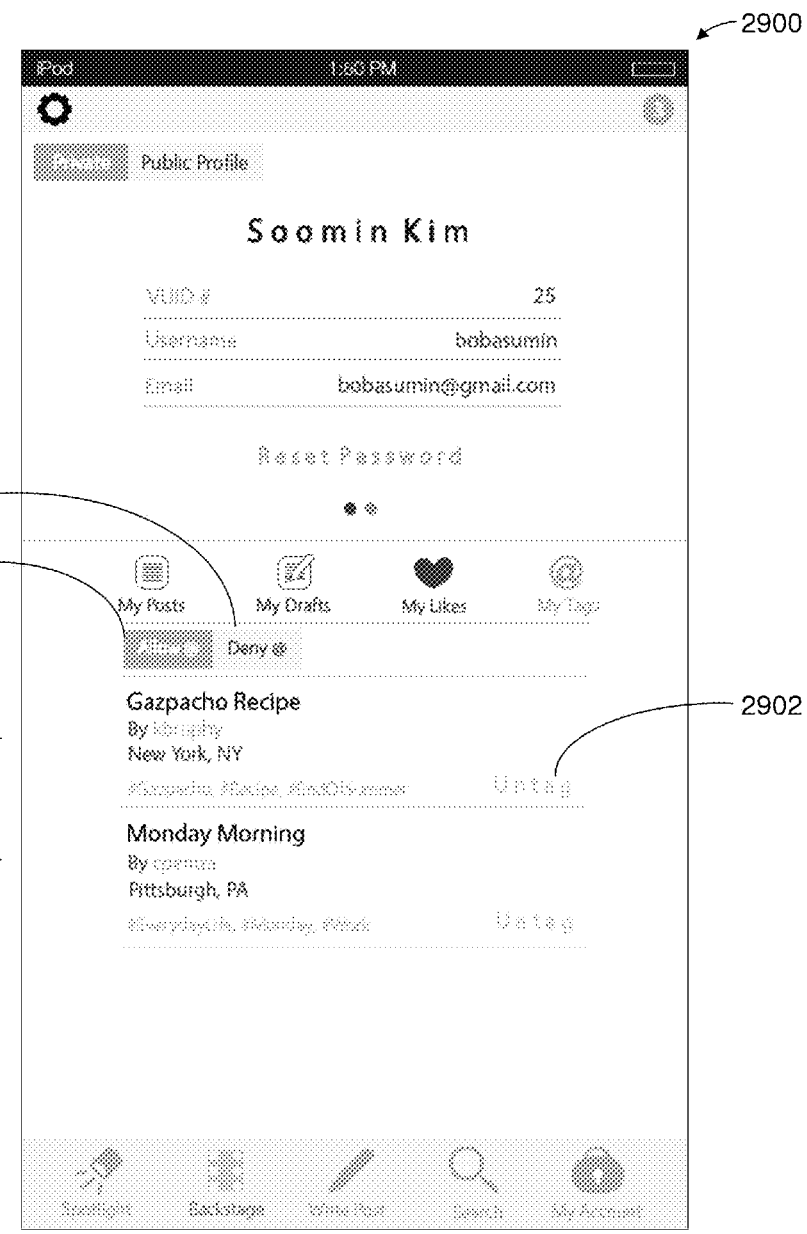
FIG. 29 shows an exemplary screen view of a "My Tags" summary display screen, in one embodiment of the invention.

FIG. 29 shows an exemplary screen view 2900 of a "My Tags" summary display screen, in one embodiment of the invention. Screen view 2900 shows summaries 2901 of the two posts that have hashtags matching hashtags contained within the user's own posts or are associated with the current user's username (i.e., "My Tags"). From this screen, the user can select either of the two posts to view the contents of the post. The user can also select an "Untag" button 2902 to remove an irrelevant post that happens to have matching hashtags from the list. Additionally, the user can select an allow button 2903 or a deny button 2904 to change whether another user has permission to associate the current user with the other user's post.

Figure 30:
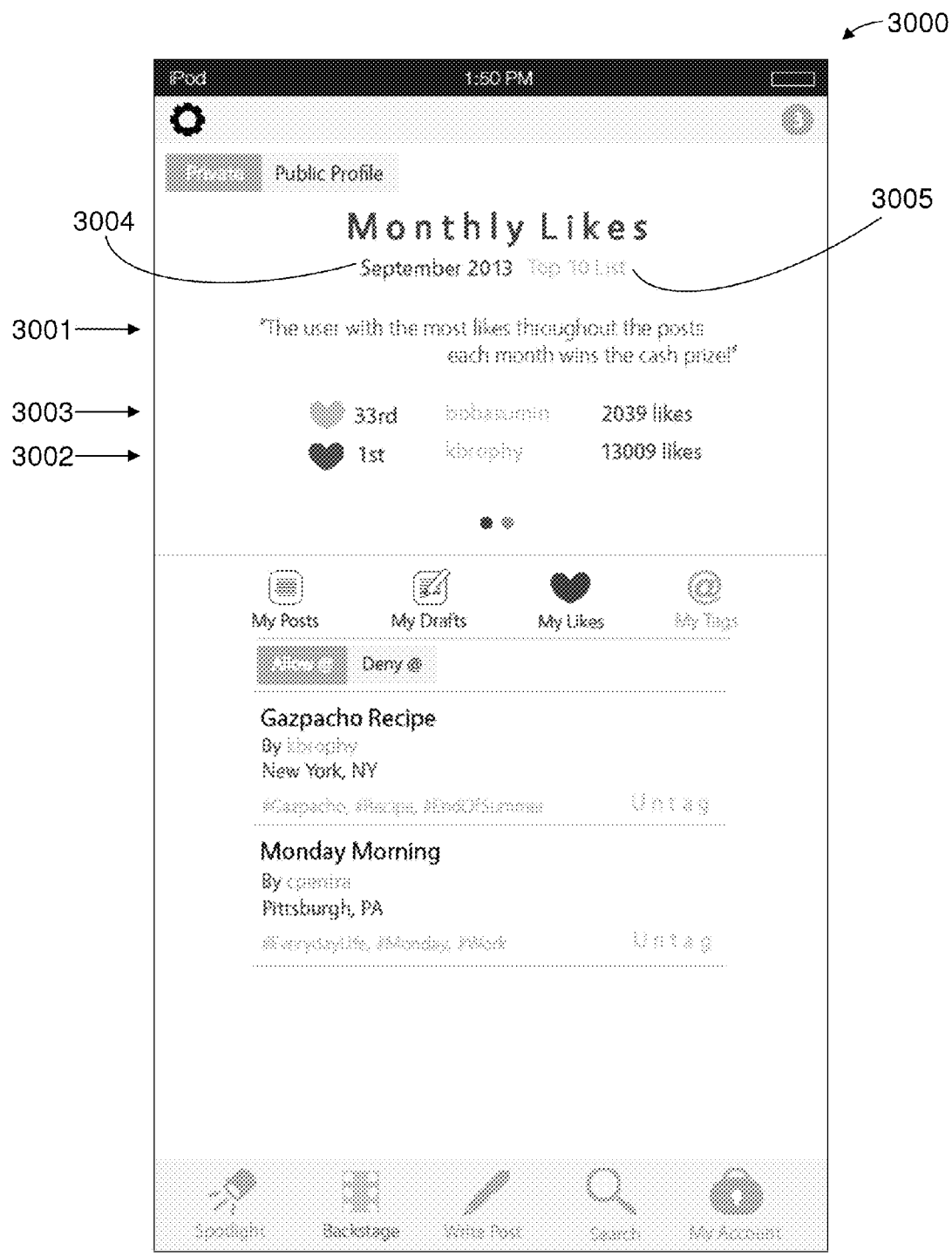
FIG. 30 shows an exemplary screen view of a "Monthly Likes" display screen, in one embodiment of the invention.

FIG. 30 shows an exemplary screen view 3000 of a "Monthly Likes" display screen, in one embodiment of the invention. Screen view 3000 shows a message 3001 indicating that the user having the most likes throughout his or her posts at the end of each month will win a cash prize, along with a mini-leaderboard. The mini-leaderboard shows an indication 3002 of which user is currently in first place to win the cash prize and that user's currently-accumulated number of likes, together with an indication 3003 of the current user's current ranking and the current user's currently-accumulated number of likes. The user can choose between the "Monthly Likes" display screen view 3000 by selecting a button 3004 for the current month's mini-leaderboard, or a Top-10 leaderboard list button 3005. After selecting the Top-10 leaderboard list button 3005, a user is led to a screen such as screen 3100 of FIG. 31.

Figure 31:
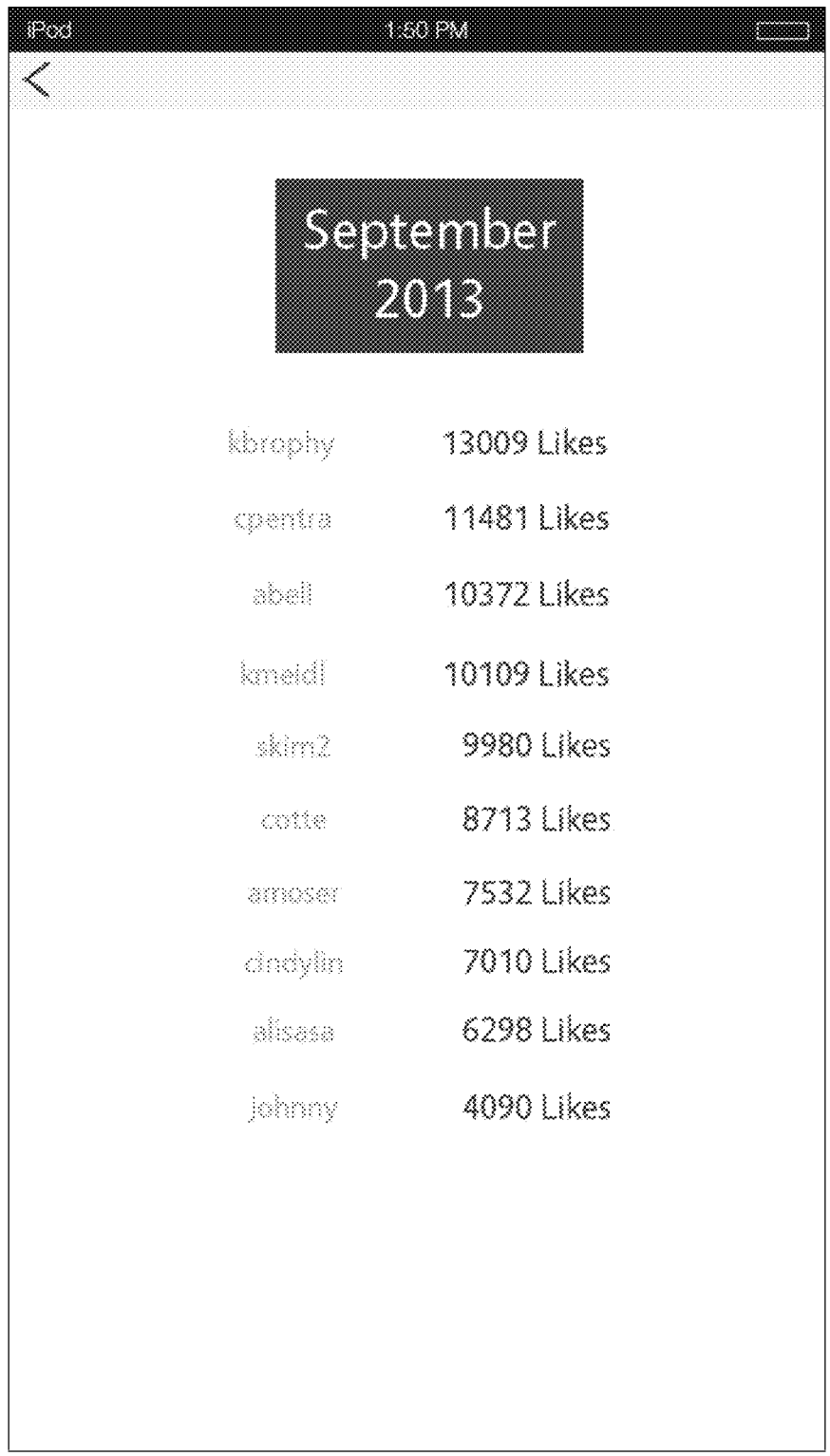
FIG. 31 shows an exemplary screen view of a Top-10 leaderboard list, in one embodiment of the invention.

FIG. 31 shows an exemplary screen view 3100 of a Top-10 leaderboard list, in one embodiment of the invention. As shown, screen view 3100 shows which user is currently in first place to win the cash prize and that user's currently-accumulated number of likes, along with the nine other users having the highest currently-accumulated numbers of likes for the current calendar month.

Figure 32:
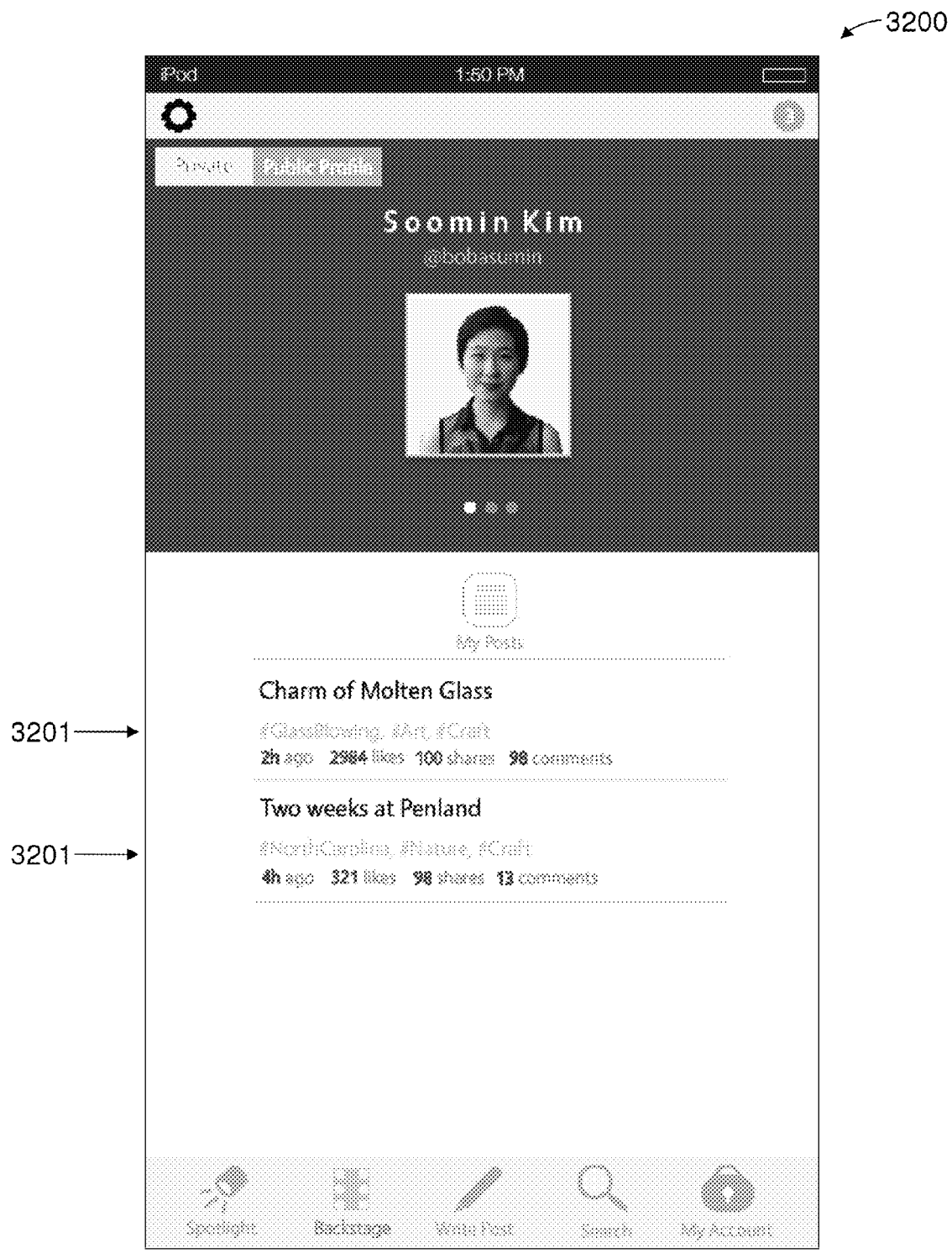
FIG. 32 shows a first exemplary public profile screen view, in one embodiment of the invention.

FIG. 32 shows a first exemplary public profile screen view 3200, in one embodiment of the invention. While all of the "My Account" information described above is not necessarily made available to all members of the social media platform, screen view 3200 shows the portions of the user information that are made available publicly, i.e., to all other members of the social media platform. As shown, screen view 3200 shows summaries 3201 of the two posts that are the user's posts (i.e., "My Posts"). From this screen, another user can select either of these two posts to view the contents of the post.

Figure 33:
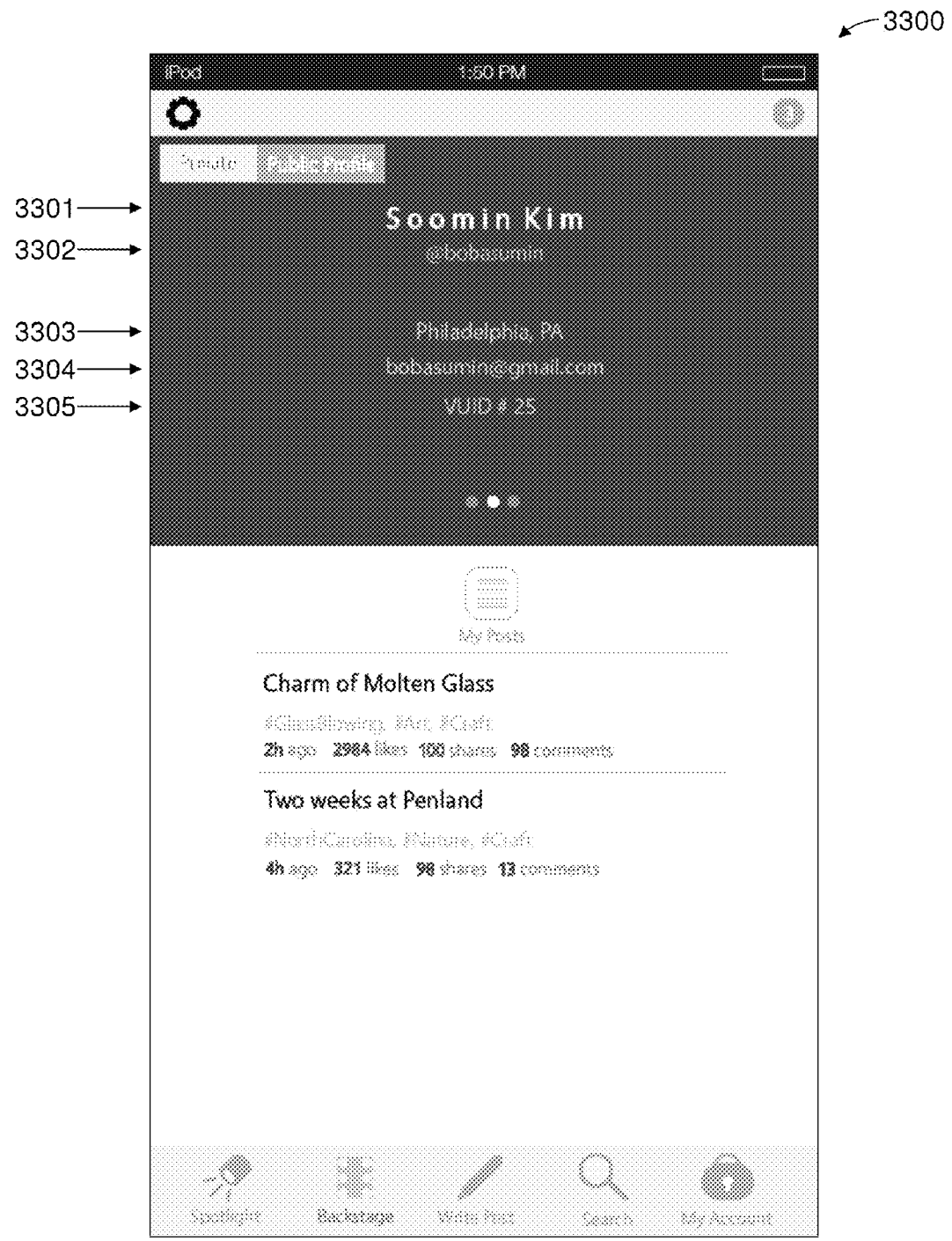
FIG. 33 shows a second exemplary public profile screen view, in one embodiment of the invention.

FIG. 33 shows a second exemplary public profile screen view 3300, in one embodiment of the invention. As shown, screen view 3300 shows the user's full name 3301, username 3302, geographic location 3303, email address 3304, and unique numeric identification number 3305 (or VUID number) registered with server 110.

Figure 34:
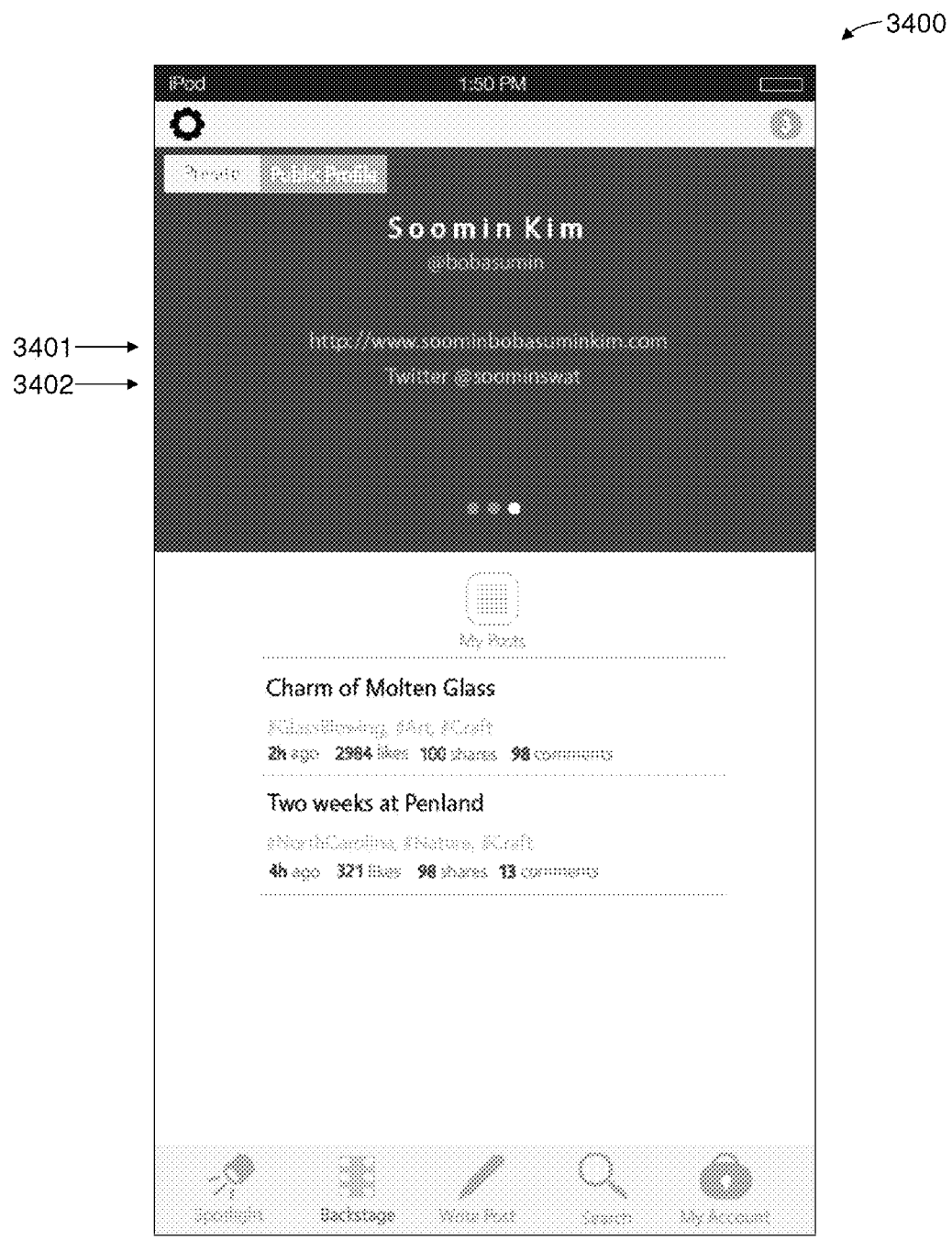
FIG. 34 shows a third exemplary public profile screen view, in one embodiment of the invention.

FIG. 34 shows a third exemplary public profile screen view 3400, in one embodiment of the invention. As shown, screen view 3400 shows the user's web site URL 3401 and Twitter username 3402.

Figure 35:
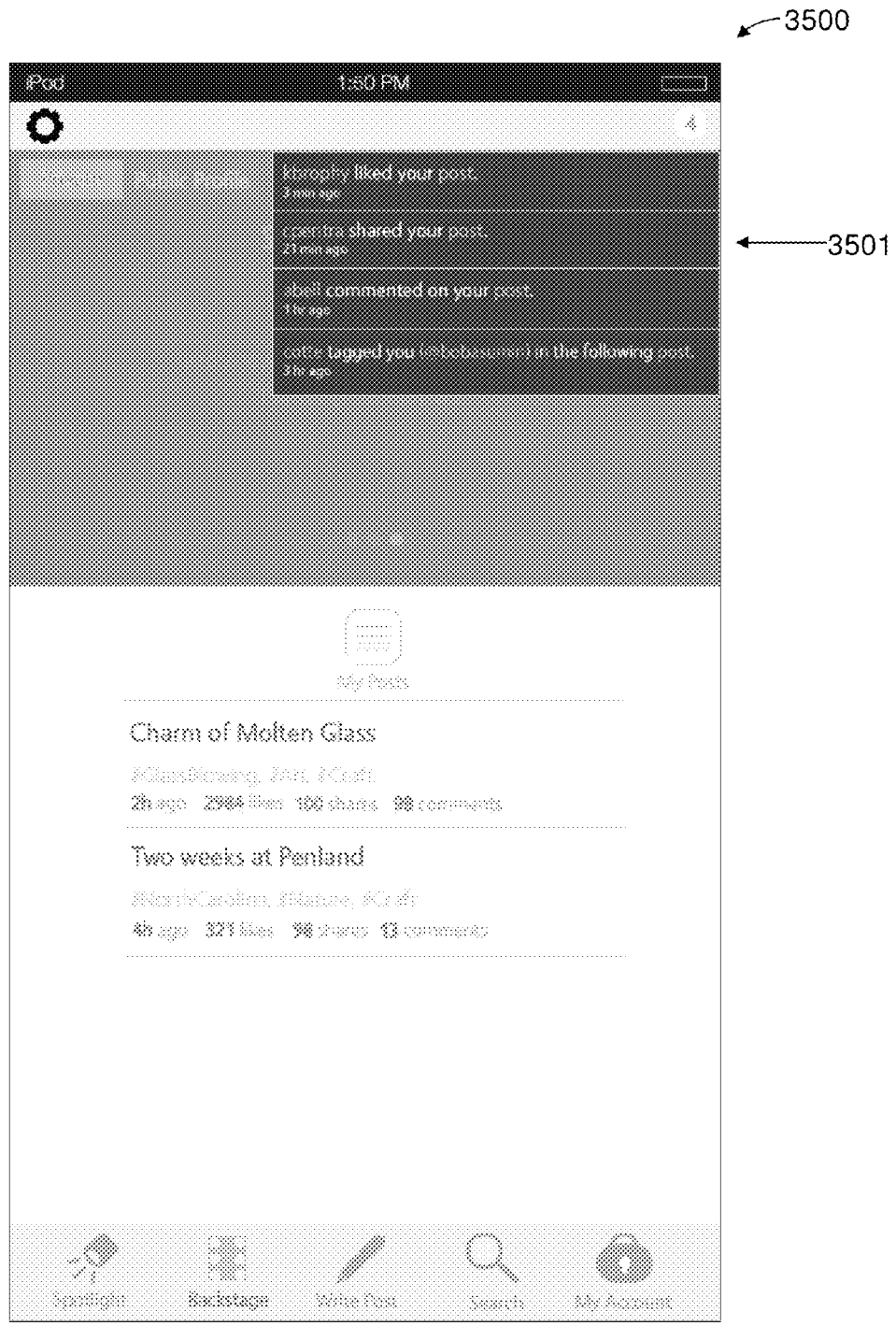
FIG. 35 shows an exemplary notification screen view, in one embodiment of the invention.

FIG. 35 shows an exemplary notification screen view 3500, in one embodiment of the invention. As shown, while using application running on mobile devices 102a, 102b, the user may receive various notifications of activities by other users of the social media platform in a notification area 3501 within screen view 3500, such as likes, shares, comments, tags, and the like. These notifications may be displayed in or near real time to stimulate user excitement and encourage user activity on the social media platform, without the appearance of the notifications may interrupting other user activity.

Figure 36:
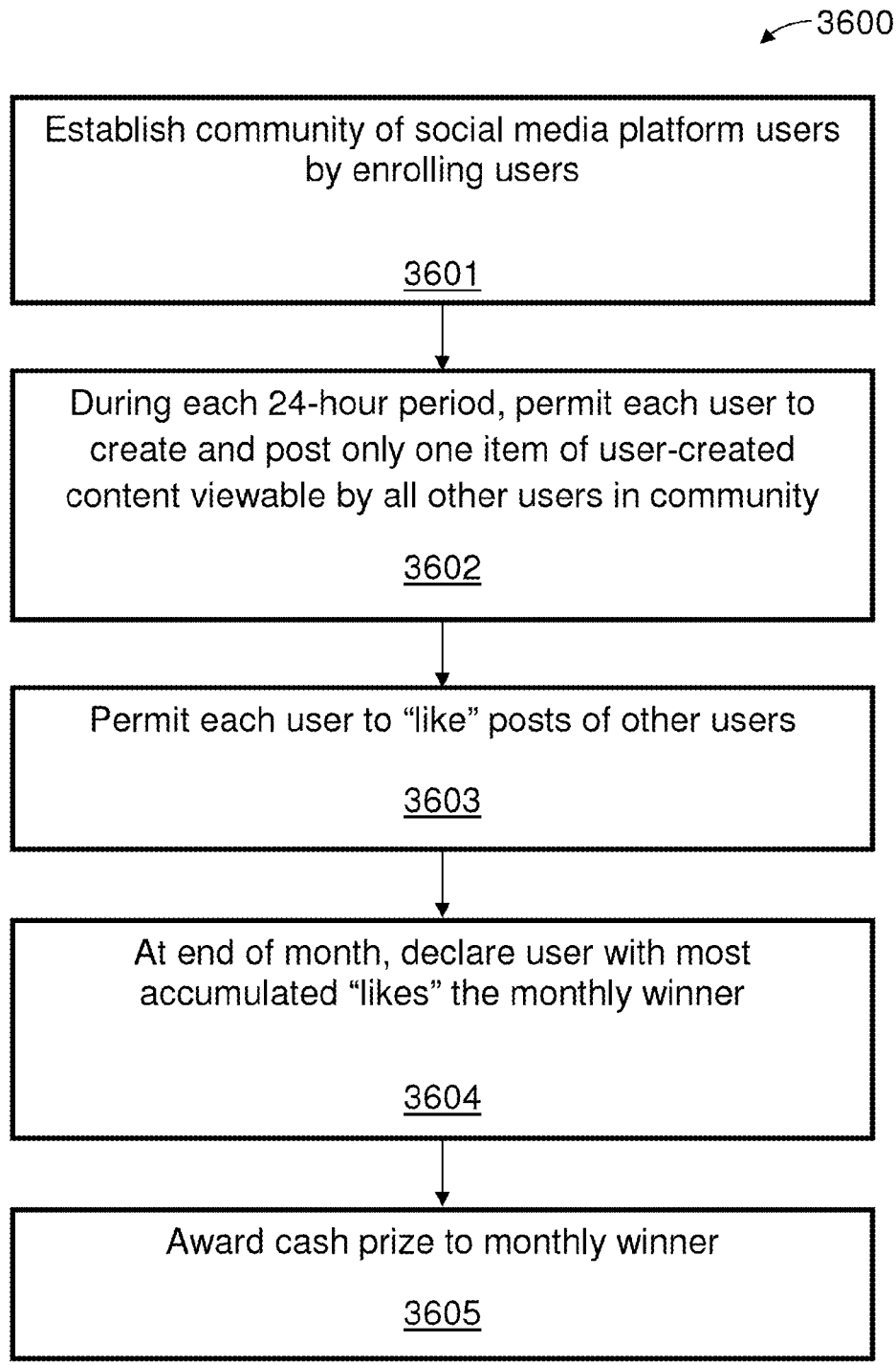
FIG. 36 shows a flowchart illustrating an exemplary method for operating a social media platform, in one embodiment of the invention.

FIG. 36 shows a flowchart illustrating an exemplary method 3600 for operating a social media platform, in one embodiment of the invention. As shown, at step 3601, first, a community of social media platform users is established by enrolling users via a sign-up process. At step 3602, during each 24-hour period, each user is permitted to create and post only one item of user-created content viewable by all other users in the community. At step 3603, each user is permitted to "like" the posts of other users. At step 3604, at the end of the month, the user with the most accumulated "likes" is declared the monthly winner. At step 3605, a cash prize is awarded to the monthly winner.

It should be understood that the foregoing describes certain exemplary embodiments of the present invention, and that other implementations are possible.

Alternative Embodiments

Although a "like" system of rating content has been described herein, other types of rating systems are possible in other embodiments, such as numeric rating systems (e.g., scale of 1 to 10, etc.), like/dislike systems, and so forth.

It should be understood that different embodiments of the invention may be adaptable for different and specialized purposes. Embodiments of the invention may include implementation of a system on one or more shared servers or in one or more hardened appliances and may be part of a larger social media platform that incorporates content-sharing as merely one aspect of the platform.

It should also be understood that software and/or hardware consistent with embodiments of the invention can be employed, e.g., at endpoint nodes of a network, centrally within a network, as part of a network node, between a standalone pair of interconnected devices not networked to other devices, at a user's end, at the server end, or at any other location within a scheme of interconnected devices.

It should be understood that appropriate hardware, software, or a combination of both hardware and software is provided to effect the processing described above, in the various embodiments of the invention. It should further be recognized that a particular embodiment might support one or more of the modes of operation described herein, but not necessarily all of these modes of operation.

It should be understood that various changes in the details, materials, and arrangements of the parts which have been described and illustrated in order to explain the nature of embodiments of the invention may be made by those skilled in the art without departing from the scope of the invention. For example, it should be understood that the inventive concepts of embodiments of the invention may be applied not only in a social media platform for incentivizing the creation of user-generated content, but also in other applications for which embodiments of the invention may have utility, including, for example, other types of content-generation scenarios and other types of competition and contest scenarios.

Embodiments of the present invention can take the form of methods and apparatuses for practicing those methods. Such embodiments can also take the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing embodiments of the invention. Embodiments of the invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing embodiments of the invention. When implemented on a general-purpose processor, the program code segments combine with the processor to provide a unique device that operates analogously to specific logic circuits.

It will be appreciated by those skilled in the art that although the functional components of the exemplary embodiments of the system described herein may be embodied as one or more distributed computer program processes, data structures, dictionaries and/or other stored data on one or more conventional general-purpose computers (e.g., IBM-compatible, Apple Macintosh, and/or RISC microprocessor-based computers), mainframes, minicomputers, conventional telecommunications (e.g., modem, T1, fiber-optic line, DSL, satellite and/or ISDN communications), memory storage means (e.g., RAM, ROM) and storage devices (e.g., computer-readable memory, disk array, direct access storage) networked together by conventional network hardware and software (e.g., LAN/WAN network backbone systems and/or Internet), other types of computers and network resources may be used without departing from the present invention. One or more networks discussed herein may be a local area network, wide area network, internet, intranet, extranet, proprietary network, virtual private network, a TCP/IP-based network, a wireless network (e.g., IEEE 802.11 or Bluetooth), an e-mail based network of e-mail transmitters and receivers, a modem-based, cellular, or mobile telephonic network, an interactive telephonic network accessible to users by telephone, or a combination of one or more of the foregoing.

Embodiments of the invention as described herein may be implemented in one or more computers residing on a network transaction server system, and input/output access to embodiments of the invention may include appropriate hardware and software (e.g., personal and/or mainframe computers provisioned with Internet wide area network communications hardware and software (e.g., CQI-based, FTP, Netscape Navigator™, Mozilla Firefox™, Microsoft Internet Explorer™, Google Chrome™, or Apple Safari™ HTML Internet-browser software, and/or direct real-time or near-real-time TCP/IP interfaces accessing real-time TCP/IP sockets) for permitting human users to send and receive data, or to allow unattended execution of various operations of embodiments of the invention, in real-time and/or batch-type transactions. Likewise, a system consistent with the present invention may include one or more remote Internet-based servers accessible through conventional communications channels (e.g., conventional telecommunications, broadband communications, wireless communications) using conventional browser software (e.g., Netscape Navigator™, Mozilla Firefox™, Microsoft Internet Explorer™, Google Chrome™, or Apple Safari™). Thus, embodiments of the present invention may be appropriately adapted to include such communication functionality and Internet browsing ability. Additionally, those skilled in the art will recognize that the various components of the server system of the present invention may be remote from one another, and may further include appropriate communications hardware/software and/or LAN/WAN hardware and/or software to accomplish the functionality herein described.

Each of the functional components of embodiments of the present invention may be embodied as one or more distributed computer-program processes running on one or more conventional general purpose computers networked together by conventional networking hardware and software. Each of these functional components may be embodied by running distributed computer-program processes (e.g., generated using "full-scale" relational database engines such as IBM DB2™, Microsoft SQL Server™, Sybase SQL Server™, or Oracle 10g™ database managers, and/or a JDBC interface to link to such databases) on networked computer systems (e.g., including mainframe and/or symmetrically or massively-parallel computing systems such as the IBM SB2™ or HP 9000™ computer systems) including appropriate mass storage, networking, and other hardware and software for permitting these functional components to achieve the stated function. These computer systems may be geographically distributed and connected together via appropriate wide- and local-area network hardware and software. In one embodiment, data stored in the database or other program data may be made accessible to the user via standard SQL queries for analysis and reporting purposes.

Primary elements of embodiments of the invention may be server-based and may reside on hardware supporting an operating system such as Microsoft Windows NT/2000™ or UNIX.

Components of a system consistent with embodiments of the invention may include mobile and non-mobile devices.

Mobile devices that may be employed in embodiments of the present invention include personal digital assistant (PDA) style computers, e.g., as manufactured by Apple Computer, Inc. of Cupertino, Calif., or Palm, Inc., of Santa Clara, Calif., and other computers running the Android, Symbian, RIM Blackberry, Palm webOS, or iPhone operating systems, Windows CE™ handheld computers, or other handheld computers (possibly including a wireless modem), as well as wireless, cellular, or mobile telephones (including GSM phones, J2ME and WAP-enabled phones, Internet-enabled phones and data-capable smart phones), one- and two-way paging and messaging devices, laptop computers, etc. Other telephonic network technologies that may be used as potential service channels in a system consistent with embodiments of the invention include 2.5G cellular network technologies such as GPRS and EDGE, as well as 3G technologies such as CDMA1xRTT and WCDMA2000, 4G technologies, and the like. Although mobile devices may be used in embodiments of the invention, non-mobile communications devices are also contemplated by embodiments of the invention, including personal computers, Internet appliances, set-top boxes, landline telephones, etc. Clients may also include a PC that supports Apple Macintosh™, Microsoft Windows 95/98/NT/ME/CE/2000/XP/Vista/7/8™, a UNIX Motif workstation platform, or other computer capable of TCP/IP or other network-based interaction. In one embodiment, no software other than a web browser may be required on the client platform.

Alternatively, the aforesaid functional components may be embodied by a plurality of separate computer processes (e.g., generated via dBase™, Xbase™, MS Access™ or other "flat file" type database management systems or products) running on IBM-type, Intel Pentium™ or RISC microprocessor-based personal computers networked together via conventional networking hardware and software and including such other additional conventional hardware and software as may be necessary to permit these functional components to achieve the stated functionalities. In this alternative configuration, since such personal computers typically may be unable to run full-scale relational database engines of the types presented above, a non-relational flat file "table" (not shown) may be included in at least one of the networked personal computers to represent at least portions of data stored by a system according to embodiments of the present invention. These personal computers may run the Unix, Microsoft Windows NT/2000™ or Windows 95/98/NT/ME/CE/2000/XP/Vista/7/8™ operating systems. The aforesaid functional components of a system according to the invention may also include a combination of the above two configurations (e.g., by computer program processes running on a combination of personal computers, RISC systems, mainframes, symmetric or parallel computer systems, and/or other appropriate hardware and software, networked together via appropriate wide- and local-area network hardware and software).

A system according to embodiments of the present invention may also be part of a larger system including multi-database or multi-computer systems or "warehouses" wherein other data types, processing systems (e.g., transaction, financial, administrative, statistical, data extracting and auditing, data transmission/reception, and/or accounting support and service systems), and/or storage methodologies may be used in conjunction with those of the present invention to achieve additional functionality.

In one embodiment, source code may be written in an object-oriented programming language using relational databases. Such an embodiment may include the use of programming languages such as C++ and toolsets such as Microsoft's .Net™ framework. Other programming languages that may be used in constructing a system according to embodiments of the present invention include Java, HTML, Perl, UNIX shell scripting, assembly language, Fortran, Pascal, Visual Basic, and QuickBasic. Those skilled in the art will recognize that embodiments of the present invention may be implemented in hardware, software, or a combination of hardware and software.

Accordingly, the terms "server," "computer," and "system," as used herein, should be understood to mean a combination of hardware and software components including at least one machine having a processor with appropriate instructions for controlling the processor. The singular terms "server," "computer," and "system" should also be understood to refer to multiple hardware devices acting in concert with one another, e.g., multiple personal computers in a network; one or more personal computers in conjunction with one or more other devices, such as a router, hub, packet-inspection appliance, or firewall; a residential gateway coupled with a set-top box and a television; a network server coupled to a PC; a mobile phone coupled to a wireless hub; and the like. The term "processor" should be construed to include multiple processors operating in concert with one another.

It should also be appreciated from the outset that one or more of the functional components may alternatively be constructed out of custom, dedicated electronic hardware and/or software, without departing from the present invention. Thus, embodiments of the invention are intended to cover all such alternatives, modifications, and equivalents as may be included within the spirit and broad scope of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Although the invention has been set forth in terms of the exemplary embodiments described herein and illustrated in the attached documents, it is to be understood that such invention is purely illustrative and is not to be interpreted as limiting. Consequently, various alterations, modifications, and/or alternative embodiments and applications may be suggested to those skilled in the art after having read this disclosure. Accordingly, it is intended that the invention be interpreted as encompassing all alterations, modifications, or alternative embodiments and applications as fall within the true spirit and scope of this disclosure.

It will be further understood that various changes in the details, materials, and arrangements of the parts which have been described and illustrated in order to explain the nature of this invention may be made by those skilled in the art without departing from the scope of the disclosure as expressed in the following claims.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

The invention claimed is:

1. A server-implemented method for operating a social media platform with gamification of user-generated content, the method comprising:
   (a) the server permitting a plurality of users to register as members of the social media platform;
   (b) the server permitting a plurality of members to upload user-generated content, wherein the server permits each member to upload no more than a limited number of items of user-generated content during each instance of a time interval;
   (c) the server permitting members to access user-generated content uploaded by other members of the social media platform and the server displaying, to the accessing members, the accessed user-generated content in a display area of the social media platform;
   (d) the server permitting members to rate user-generated content uploaded by other members of the social media platform;
   (e) the server aggregating, over a time period comprising multiple instances of the time interval, ratings from a plurality of members; and
   (f) the server declaring a winner from among the plurality of members based on the aggregated ratings over the time period, wherein:
   steps (a)-(f) are repeated over consecutive instances of the time period;
   each instance of the time period comprises multiple instances of the time interval such that the server permits each member to upload more than the limited number of items of user-generated content during each instance of the time period, but the server prevents each member from uploading more than the limited number of items of user-generated content during each instance of the time interval;
   for each item of user-generated content, the server permits members to rate the item of user-generated content until the end of the time period and the server accumulates the ratings for the item of user-generated content until the end of the time period; and
   the aggregated rating for a member submitting multiple items of user-generated content during the time period is based on a sum of the ratings for all of the multiple items of user-generated content submitted by the member.

2. The method of claim 1, wherein the winner is the user having the highest aggregate rating of uploaded content over the time period.

3. The method of claim 1, wherein step (d) comprises the server permitting members to generate a "like" indication for the content.

4. The method of claim 3, wherein step (e) comprises the server counting the number of "like" indications.

5. The method of claim 4, wherein step (f) comprises the server declaring, as the winner, the user having the highest count of "like" indications over the time period.

6. The method of claim 1, wherein:
   the social media platform has a main landing page or showcase page and a secondary display area for content accessible via a manual selection option; and further comprising:
   (g) prior to the beginning of a predetermined time interval, the server randomly selecting one member to create an item of user-generated content; and
   (h) during the time interval, the server permitting display of the item of user-generated content on the main landing page or showcase page and the server permitting display of all other items of user-generated content only in the secondary display area.

7. The method of claim 6, further comprising, at the end of the predetermined time interval, the server repeating steps (g) and (h) for a different time interval.

8. The method of claim 6, wherein step (g) is performed by lottery, and each user counts as one lottery entry.

9. The method of claim 8, wherein a user earns one or more lottery entries upon the occurrence of one or more events or conditions.

10. The method of claim 1, wherein the time period is one month.

11. The method of claim 1, wherein step (b) comprises permitting each member to upload only one item of user-generated content during a time interval.

12. The method of claim 11, wherein the time interval is one day.

13. The method of claim 1, wherein the user-generated content includes at least one of: an image, a video, a portion of text, and a multimedia presentation.

14. The method of claim 1, wherein step (b) comprises permitting members to upload user-generated content anonymously.

15. A server for operating a social media platform with gamification of user-generated content, the server adapted to:
   permit a plurality of users to register as members of the social media platform;
   permit a plurality of members to upload user-generated content, wherein the server is adapted to permit each member to upload no more than a limited number of items of user-generated content during each instance of a time interval;
   permit members to access user-generated content uploaded by other members of the social media platform;
   display, to the accessing members, the accessed user-generated content in a display area of the social media platform;
   permit members to rate user-generated content uploaded by other members of the social media platform;
   aggregate, over a time period comprising multiple instances of the time interval, ratings from a plurality of members; and
   declare a winner from among the plurality of members based on the aggregated ratings over the time period, wherein:
   the server is adapted to operate the social media platform over consecutive instances of the time period;
   each instance of the time period comprises multiple instances of the time interval such that the server permits each member to upload more than the limited number of items of user-generated content during each instance of the time period, but the server prevents each member from uploading more than the limited number of items of user-generated content during each instance of the time interval;
   for each item of user-generated content, the server is adapted to permit members to rate the item of user-generated content until the end of the time period and the server is adapted to accumulate the ratings for the item of user-generated content until the end of the time period; and
   the aggregated rating for a member submitting multiple items of user-generated content during the time period is based on a sum of the ratings for all of the multiple items of user-generated content submitted by the member.

16. A non-transitory machine-readable medium, having encoded thereon program code, wherein, when the program code is executed by a machine, the machine implements a method for operating a social media platform with gamification of user-generated content, the method comprising:
    (a) the server permitting a plurality of users to register as members of the social media platform;
    (b) the server permitting a plurality of members to upload user-generated content, wherein the server permits each member to upload no more than a limited number of items of user-generated content during each instance of a time interval;
    (c) the server permitting members to access user-generated content uploaded by other members of the social media platform and the server displaying, to the accessing members, the accessed user-generated content in a display area of the social media platform;
    (d) the server permitting members to rate user-generated content uploaded by other members of the social media platform;
    (e) the server aggregating, over a time period comprising multiple instances of the time interval, ratings from a plurality of members; and
    (f) the server declaring a winner from among the plurality of members based on the aggregated ratings over the time period, wherein:
    steps (a)-(f) are repeated over consecutive instances of the time period;
    each instance of the time period comprises multiple instances of the time interval such that the server permits each member to upload more than the limited number of items of user-generated content during each instance of the time period, but the server prevents each member from uploading more than the limited number of items of user-generated content during each instance of the time interval;
    for each item of user-generated content, the server permits members to rate the item of user-generated content until the end of the time period and the server accumulates the ratings for the item of user-generated content until the end of the time period; and
    the aggregated rating for a member submitting multiple items of user-generated content during the time period is based on a sum of the ratings for all of the multiple items of user-generated content submitted by the member.

17. A server-implemented method for operating a social media platform having a main landing page or showcase page and a secondary display area for content accessible via a manual selection option, the method comprising:
    (a) the server permitting a plurality of users to register as members of the social media platform;
    (b) the server permitting a plurality of members to upload user-generated content, wherein the server permits each member to upload no more than a limited number of items of user-generated content during each instance of a time interval;
    (c) the server permitting members to access user-generated content uploaded by other members of the social media platform over a time period comprising multiple instances of the time interval;
    (d) prior to the beginning of a predetermined time interval, the server randomly selecting one member to create an item of user-generated content; and
    (e) during the time interval, the server permitting display of the randomly-selected item of user-generated content on the main landing page or showcase page and permitting display of all other items of user-generated content only in the secondary display area, wherein:
    steps (a)-(e) are repeated over consecutive instances of the time period;
    each instance of the time period comprises multiple instances of the time interval such that the server permits each member to upload more than the limited number of items of user-generated content during each instance of the time period, but the server prevents each member from uploading more than the limited number of items of user-generated content during each instance of the time interval;
    for each item of user-generated content, the server permits members to rate the item of user-generated content until the end of the time period and the server accumulates the ratings for the item of user-generated content until the end of the time period; and
    the aggregated rating for a member submitting multiple items of user-generated content during the time period is based on a sum of the ratings for all of the multiple items of user-generated content submitted by the member.

18. The method of claim 17, wherein an item of user-generated content in the secondary display area can be displayed only by accessing the secondary display area via the manual selection option.

19. A server for operating a social media platform having a main landing page or showcase page and a secondary display area for content accessible via a manual selection option, the server adapted to:
    permit a plurality of users to register as members of the social media platform;
    permit a plurality of members to upload user-generated content, wherein the server is adapted to permit each member to upload no more than a limited number of items of user-generated content during each instance of a time interval;
    permit members to access user-generated content uploaded by other members of the social media platform over a time period comprising multiple instances of the time interval;
    prior to the beginning of a predetermined time interval, randomly select one member to create an item of user-generated content; and
    during the time interval, permit display of the randomly-selected item of user-generated content on the main landing page or showcase page and permit display of all other items of user-generated content only in the secondary display area, wherein:
    the server is adapted to operate the social media platform over consecutive instances of the time period; and
    each instance of the time period comprises multiple instances of the time interval such that the server permits each member to upload more than the limited number of items of user-generated content during each instance of the time period, but the server prevents each member from uploading more than the limited number of items of user-generated content during each instance of the time interval;
    for each item of user-generated content, the server is adapted to permit members to rate the item of user-generated content until the end of the time period and the server is adapted to accumulate the ratings for the item of user-generated content until the end of the time period; and the aggregated rating for a member submitting multiple items of user-generated content during the time period is based on a sum of the ratings for all of the multiple items of user-generated content submitted by the member.

20. The method of claim 19, wherein an item of user-generated content in the secondary display area can be displayed only by accessing the secondary display area via the manual selection option.

21. A non-transitory machine-readable medium, having encoded thereon program code, wherein, when the program code is executed by a machine, the machine implements a method for operating a social media platform having a main landing page or showcase page and a secondary display area for content accessible via a manual selection option, the method comprising:
  (a) permitting a plurality of users to register as members of the social media platform;
  (b) permitting a plurality of members to upload user-generated content, wherein each member is permitted to upload no more than a limited number of items of user-generated content during each instance of a time interval;
  (c) permitting members to access user-generated content uploaded by other members of the social media platform over a time period comprising multiple instances of the time interval;
  (d) prior to the beginning of a predetermined time interval, randomly selecting one member to create an item of user-generated content; and
  (e) during the time interval, permitting display of the randomly-selected item of user-generated content on the main landing page or showcase page and permitting display of all other items of user-generated content only in the secondary display area, wherein:

steps (a)-(e) are repeated over consecutive instances of the time period;

each instance of the time period comprises multiple instances of the time interval such that the server permits each member to upload more than the limited number of items of user-generated content during each instance of the time period, but the server prevents each member from uploading more than the limited number of items of user-generated content during each instance of the time interval;

for each item of user-generated content, the server permits members to rate the item of user-generated content until the end of the time period and the server accumulates the ratings for the item of user-generated content until the end of the time period; and the aggregated rating for a member submitting multiple items of user-generated content during the time period is based on a sum of the ratings for all of the multiple items of user-generated content submitted by the member.

22. The method of claim 21, wherein an item of user-generated content in the secondary display area can be displayed only by accessing the secondary display area via the manual selection option.

* * * * *